United States Patent
Kuraki et al.

(10) Patent No.: US 9,260,315 B2
(45) Date of Patent: Feb. 16, 2016

(54) METHODS FOR PRODUCING GARNET PRECURSOR MICROPARTICLES AND MICROPARTICLES HAVING GARNET STRUCTURE

(71) Applicant: M. TECHNIQUE CO., LTD., Izuma-shi, Osaka (JP)

(72) Inventors: Jun Kuraki, Izumi (JP); Masakazu Enomura, Izumi (JP)

(73) Assignee: M. Technique Co., Ltd., Izumi-shi (JP)

( * ) Notice: Subject to any disclaimer, the term of this patent is extended or adjusted under 35 U.S.C. 154(b) by 0 days.

(21) Appl. No.: 14/374,502

(22) PCT Filed: Jan. 24, 2013

(86) PCT No.: PCT/JP2013/051424
§ 371 (c)(1),
(2) Date: Jul. 24, 2014

(87) PCT Pub. No.: WO2013/111811
PCT Pub. Date: Aug. 1, 2013

(65) Prior Publication Data
US 2015/0010456 A1 Jan. 8, 2015

(30) Foreign Application Priority Data
Jan. 25, 2012 (JP) ................. 2012-013084

(51) Int. Cl.
*C01F 17/00* (2006.01)
*B01F 7/00* (2006.01)
*B01J 19/18* (2006.01)
*B01F 15/02* (2006.01)

(52) U.S. Cl.
CPC .......... *C01F 17/0043* (2013.01); *B01F 7/00775* (2013.01); *B01F 15/0203* (2013.01); *B01J 19/1887* (2013.01); *C01F 17/0025* (2013.01); *B01J 2219/00085* (2013.01); *B01J 2219/00177* (2013.01); *C01P 2002/72* (2013.01); *C01P 2002/85* (2013.01); *C01P 2004/04* (2013.01); *C01P 2004/51* (2013.01); *C01P 2004/62* (2013.01); *C01P 2004/64* (2013.01)

(58) Field of Classification Search
None
See application file for complete search history.

(56) References Cited

U.S. PATENT DOCUMENTS

| 2003/0186034 A1 | 10/2003 | Yamada |
| 2010/0243947 A1 | 9/2010 | Enomura |
| 2011/0015054 A1 | 1/2011 | Enomura |
| 2014/0037519 A1* | 2/2014 | Kuraki et al. ................. 423/104 |

FOREIGN PATENT DOCUMENTS

| CN | 101784484 A | 7/2010 |
| CN | 102173775 A | 9/2011 |
| EP | 2193865 A1 | 6/2010 |
| GB | 2377661 A | 1/2003 |
| GB | 2397456 A1 | 12/2011 |
| JP | 2-92817 A | 4/1990 |
| JP | 2-133386 A | 5/1990 |
| JP | 11-130428 A | 5/1999 |
| JP | 2001-270714 A | 10/2001 |
| JP | 2001-270775 A | 10/2001 |
| JP | 2003-277051 A | 10/2003 |
| WO | WO 2009/008392 A1 | 1/2009 |
| WO | 2012/147209 | * 11/2012 |

* cited by examiner

*Primary Examiner* — Steven Bos
(74) *Attorney, Agent, or Firm* — Birch, Stewart, Kolasch & Birch, LLP

(57) ABSTRACT

The present invention addresses the problem of providing producing processes for garnet precursor microparticles (a precursor for microparticles of garnet structure) and microparticles of garnet structure. One of the processing processes comprises mixing ions of at least two elements with a basic substances that contain the at least two elements. The thin-film fluid is formed between at least two processing surfaces which are approachably and separably arranged facing each other with at least one of the processing surfaces rotating relative to the other. In the processing process, the precipitated microparticles are garnet precursor microparticles, and the molar ratio between the at least two elements in the garnet precursor microparticles is regulated by controlling the pH of the thin-film fluid after the mixing. Microparticles of garnet structure can be obtained by subjecting the garnet precursor microparticles to heat treatment. Specifically, the yttrium/aluminum molar ratio of yttrium-aluminum-garnet (YAG) precursor microparticles is regulated by controlling the pH of the thin-film fluid after the mixing, YAG being an example of the crystal of garnet structure.

20 Claims, 8 Drawing Sheets

METHODS FOR PRODUCING GARNET PRECURSOR MICROPARTICLES AND MICROPARTICLES HAVING GARNET STRUCTURE

TECHNICAL FIELD

The present invention relates to methods for producing a precursor for a microparticle having a garnet structure and a microparticle having a garnet structure; in particular, the present invention relates to methods for producing an yttrium aluminum garnet precursor microparticle and an yttrium aluminum garnet microparticle.

BACKGROUND ART

An yttrium aluminum garnet (hereinafter, YAG) is an oxide generally shown by a composition formula of $Y_3Al_5O_{12}$, and is a material used as a raw material of a laser oscillation device, a decoration goods, a high temperature material, a material for various detective devices, an alternative material for sapphire, a transparent ceramic material, and so forth. Materials having part or all of yttrium or aluminum therein replaced with other elements as well as those containing a dope element have been reported; and thus, these are very useful industrially. However, emission characteristic such as fluorescence characteristics and other characteristics such as strength, heat resistance, corrosion resistance, and transparency, change with molar ratios of the constituent elements of YAG; and thus, a YAG microparticle having the molar ratios thereof controlled is required.

As to the producing method of the YAG microparticle, several methods have been developed which include: a conventional method, as shown in Patent Document 1, in which yttrium oxide and aluminum oxide, optionally together with a sintering adjuvant, are crushed and mixed by a ball mill or the like, and then, after the mixture is subjected to a solid phase reaction at high temperature for a prescribed time, it is crushed again by a ball mill or the like to pulverize; and a conventional method, as shown in Patent Document 2 and Patent Document 3, in which an acidic solution which contains an yttrium ion and an aluminum ion is neutralized by a basic substance such as sodium hydroxide to co-precipitate an yttrium compound and an aluminum compound, and then the obtained co-precipitates are subjected to heat treatment to synthesize YAG. However, in these conventional methods, not only producing of the YAG microparticle, especially those having the size of 1 μm or less, has been extremely difficult, but also it has been very difficult to make the molar ratios of the constituent elements in the YAG microparticle homogeneous. In the conventional technology described in Patent Document 2, as it is described therein, besides a problem that there occurs contamination of impurities derived from a ball mill and the like when pulverization is carried out by using a pulverization method which mainly uses a ball mill that uses a ball or the like as a crushing medium, there have been a problem such as the one in which intended various characteristics including fluorescence characteristics of the obtained YAG microparticle cannot be expressed readily due to a physical impact given to the crystal thereof.

Applicant of the present invention provided a method for producing a ceramic microparticle as shown in Patent Document 4; however, in it, specific methods for producing neither a YAG precursor microparticle nor a YAG microparticle, with the molar ratios of the constituent elements in these microparticles being controlled, have been disclosed. Therefore, methods of producing a YAG precursor microparticle and a YAG microparticle, with the molar ratios of the constituent elements in these microparticles being controlled, have been eagerly wanted. In addition, including the YAG precursor microparticle and the YAG microparticle, methods for producing a precursor of a microparticle having a garnet structure and a microparticle having a garnet structure, with the molar ratios of the constituent elements in these microparticles being controlled, have been eagerly wanted.

PRIOR ART DOCUMENTS

Patent Document

Patent Document 1: Japanese Patent Laid-Open Publication No. H2-133386
Patent Document 2: Japanese Patent Laid-Open Publication No. 2001-270714
Patent Document 3: Japanese Patent Laid-Open Publication No. H2-92817
Patent Document 4: International Patent Laid-Open Publication No. WO 2009/008392

In view of the situation mentioned above, the present invention has an object to provide a method for producing a precursor of a microparticle having a garnet structure and a microparticle having garnet structure.

In addition, in view of the situation mentioned above, the present invention has an object to provide a method for producing yttrium aluminum garnet precursor microparticle and microparticles having yttrium aluminum garnet structure.

Inventors of the present invention curried out an extensive investigation, and as a result, they found that at the time when at least two element ions and a basic substance are mixed in a thin film fluid formed between processing surfaces which are disposed in a position they are faced with each other so as to be able to approach to and separate from each other, at least one of which rotates relative to the other, whereby separating a garnet precursor microparticle which is a precursor of a microparticle having a garnet structure and containing the said at least two elements, each molar ratio of the at least two elements in the garnet precursor microparticle could be controlled by controlling the pH of the thin film fluid after the mixing. The present invention could be completed by this found information.

In addition, inventors of the present invention carried out an extensive investigation, and as a result, they found that by using at least yttrium ion and aluminum ion as the above-mentioned at least two element ions, at the time when an yttrium aluminum garnet precursor microparticle is separated by mixing the said at least yttrium ion and aluminum ion with a basic substance in the afore-mentioned thin film fluid, the molar ratios of the said at least yttrium and aluminum in the yttrium aluminum garnet precursor microparticle could be controlled by controlling the pH of the thin film fluid after the mixing. The present invention could be completed by this found information.

An invention according to claim 1 of the present application provides a method for producing a garnet precursor microparticle, wherein in a method for producing a microparticle by mixing at least two element ions with a basic substance in a thin film fluid formed between at least two processing surfaces which are disposed in a position they are faced with each other so as to be able to approach to and separate from each other, at least one of which rotates relative to the other, whereby separating a microparticle which contains the at least two elements, the said microparticle is a precursor of a microparticle having a garnet structure, and each molar ratio of the at least two elements in the garnet precursor microparticle is controlled by controlling pH of the thin film fluid after the mixing.

An invention according to claim 2 of the present application provides the method for producing a garnet precursor microparticle according to claim 1, wherein the at least two element ions contain at least yttrium ion and aluminum ion, the garnet precursor microparticle is an yttrium aluminum garnet precursor microparticle, and the molar ratios of at least yttrium and aluminum in the yttrium aluminum garnet precursor microparticle are controlled by controlling pH of the thin film fluid after the mixing.

An invention according to claim 3 of the present application provides the method for producing a garnet precursor microparticle according to claim 1, wherein at least two fluids to be processed are used, of the at least one fluid to be processed is a fluid which contains at least yttrium ion and aluminum ion as the at least two element ions, at least one fluid to be processed other than the above-mentioned fluid to be processed is a basic fluid which contains at least one afore-mentioned basic substance, these fluids to be processed are mixed in a thin film fluid formed between at least two processing surfaces which are disposed in a position they are faced with each other so as to be able to approach to and separate from each other, at least one of which rotates relative to the other, whereby separating an yttrium aluminum garnet precursor microparticle, where at an introduction rate of at least one fluid to be processed that is introduced into between the processing surfaces is controlled whereby controlling the molar ratios of at least yttrium and aluminum in the yttrium aluminum garnet precursor microparticle.

An invention according to claim 4 of the present application provides the method for producing a garnet precursor microparticle according to claim 2 or 3, wherein the molar ratios of at least yttrium and aluminum in the yttrium aluminum garnet precursor microparticle are made within ±20% relative to the molar ratios of the yttrium ion and the aluminum ion mixed in the thin film fluid by controlling pH of the thin film fluid after the mixing in the range of 7.0 to 10.0.

An invention according to claim 5 of the present application provides the method for producing a garnet precursor microparticle according to any one of claims 2 to 4, wherein the molar ratios of yttrium and aluminum in the yttrium aluminum garnet precursor microparticle are obtained by a result of an ICP analysis.

An invention according to claim 6 of the present application provides the method for producing a garnet precursor microparticle according to any one of claims 2 to 5, wherein at least one element ion other than the yttrium ion, the aluminum ion, and the basic substance is mixed in the thin film fluid.

An invention according to claim 7 of the present application provides a method for producing a microparticle having a garnet structure, wherein the garnet structure is made by subjecting to heat treatment the garnet precursor microparticle that is produced by the method according to any one of claims 1 to 6.

An invention according to claim 8 of the present application provides the method for producing a microparticle having a garnet structure according to claim 7, wherein the heat-treatment is done by burning, and a burning temperature is chosen in the range of 950 to 1000° C.

An invention according to claim 9 of the present application provides the method for producing a garnet precursor microparticle according to any one of claims 2 to 6, wherein particle diameter of the yttrium aluminum garnet precursor microparticle is 1 µm or less.

An invention according to claim 10 of the present application provides the method for producing a microparticle having a garnet structure according to claim 7 or 8, wherein the microparticle having a garnet structure is an yttrium aluminum garnet microparticle, and molar ratios of at least yttrium and aluminum in the yttrium aluminum garnet microparticle are within ±20% of molar ratios of the yttrium ion and the aluminum ion mixed in the thin film fluid.

An invention according to claim 11 of the present application provides the method for producing a microparticle having a garnet structure according to claim 10, wherein the molar ratios of yttrium and aluminum in the yttrium aluminum garnet microparticle are the values obtained by a result of a TEM-EDS analysis.

An invention according to claim 12 of the present application provides the method for producing a microparticle having a garnet structure according to any one of claims 7, 8, 10, and 11, wherein particle diameter of the microparticle having a garnet structure is 1 µm or less.

According to mere one embodiment of the present invention, the present invention may be carried out as a method for producing a garnet precursor microparticle, wherein the method comprises:

a fluid pressure imparting mechanism for imparting a pressure to a fluid to be processed, a first processing member provided with a first processing surface of the at least two processing surfaces, providing a second processing member provided with a second processing surface of the at least two processing surfaces, and a rotation drive mechanism for rotating these processing members relative to each other; wherein each of the processing surfaces constitutes part of a sealed flow path through which the fluid to be processed under the pressure is passed, of the first and the second processing members, at least the second processing member is provided with a pressure-receiving surface, and at least part of this pressure-receiving surface is comprised of the second processing surface, the pressure-receiving surface receives a pressure applied to the fluid to be processed by the fluid pressure imparting mechanism thereby generating a force to move in the direction of separating the second processing surface from the first processing surface, the fluid to be processed under the pressure is passed between the first processing surface and the second processing surface which are disposed in a position they are faced with each other so as to be able to approach to and separate from each other, at least one of which rotates relative to the other, whereby the fluid to be processed forms a thin film fluid, and garnet precursor microparticle is separated in this thin film fluid.

According to mere another embodiment of the present invention, the present invention may be carried out as a method for producing a garnet precursor microparticle, wherein at least one fluid of the fluids to be processed passes through between both the processing surfaces while forming the thin film fluid, an another introduction path independent of the flow path for the foregoing at least one fluid is provided, at least one opening leading to this introduction path is arranged in at least any one of the first processing surface and the second processing surface, at least one fluid which is different from the foregoing at least one fluid is introduced into between the processing surfaces through this opening, the fluids to be processed are mixed in the thin film fluid, and a garnet precursor microparticle is separated in this thin film fluid.

Advantages

According to the present invention, it became possible to control molar ratios of at least yttrium and aluminum in the YAG precursor microparticle and in the YAG microparticle with the particle diameters thereof being 1 µm or less, and in addition, it became possible to conveniently produce the YAG precursor microparticle and the YAG microparticle with the controlled molar ratios; such control and production having been difficult in conventional production methods thereof. Moreover, because it became possible to control the molar ratios of the constituent elements in the YAG precursor microparticle to be obtained and in the YAG microparticle, it became possible to separately produce the YAG precursor microparticle and the YAG microparticle whose molar ratios as to at least yttrium and aluminum are controlled, with a lower production cost and a lower energy consumption than ever; and as a result of it, the YAG precursor microparticle and the YAG microparticle can be provided cheaply and stably.

Furthermore, in the present invention, other than the YAG precursor microparticle and the YAG microparticle, it became possible to make particle diameter of 1 µm or less for a microparticle precursor having a garnet structure as well as for a microparticle having a garnet structure while enabling to control the molar ratios of the constituent elements of these microparticles, so that it became possible to produce a microparticle precursor having a garnet structure and a microparticle having a garnet structure, the molar ratios thereof being controlled, with a lower production cost and a lower energy consumption as compared with conventional producing methods thereof.

Figure 1:
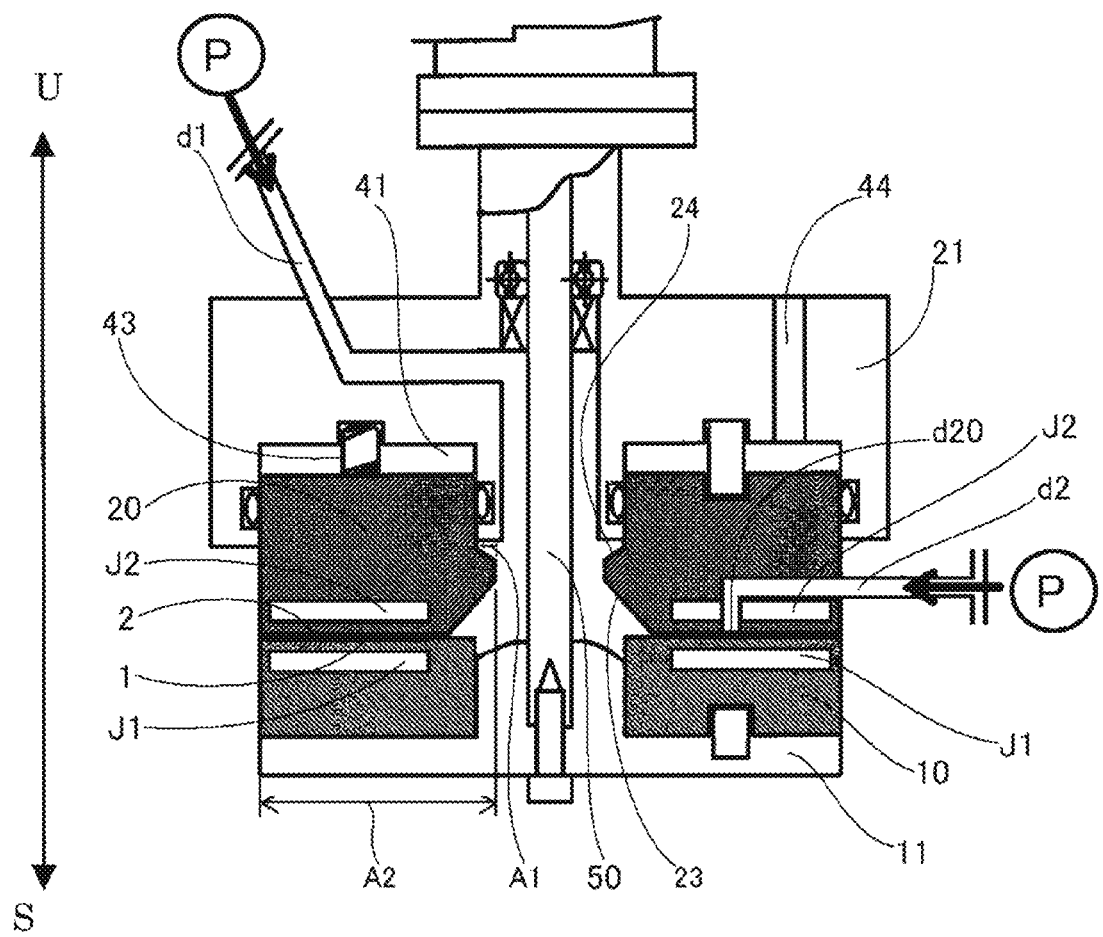
FIG. 1 is a schematic sectional view showing the fluid processing apparatus according to an embodiment of the present invention.

Hereunder, one embodiment of the present invention will be specifically explained.

Brief Overview:

The present invention relates to a method for producing a precursor of a microparticle having a garnet structure, wherein at the time when at least two element ions are mixed with a basic substance in a thin film fluid formed between at least two processing surfaces which are disposed in a position they are faced with each other so as to be able to approach to and separate from each other, at least one of which rotates relative to the other, whereby separating a garnet microparticle precursor which is a precursor of a microparticle having a garnet structure which contains the said at least two elements, each molar ratio of the at least two elements in the garnet precursor microparticles is controlled by controlling the pH of the thin film fluid after the mixing. In addition, the microparticle having a garnet structure is obtained by subjecting the garnet microparticle precursor to heat treatment to make the garnet structure thereof.

In addition, in the present invention, by using at least yttrium ion and aluminum ion as the above-mentioned at least two element ions, at the time when an yttrium aluminum garnet precursor microparticle (hereinafter, YAG precursor microparticle) is separated by mixing the said at least yttrium ion and aluminum ion with a basic substance in the aforementioned thin film fluid, the molar ratios of at least yttrium and aluminum in the YAG precursor microparticle is controlled by controlling the pH of the thin film fluid after the mixing.

Moreover, by controlling the pH of the thin film fluid after the mixing in the range of 7.0 to 10.0, the molar ratios of at least yttrium and aluminum in the YAG precursor microparticle can be made within ±20% relative to the molar ratios of yttrium ion and aluminum ion in the mixed thin film fluid. In other words, if each of the molar ratios of yttrium ion and aluminum ion in the mixed thin film fluid is made 1, the molar ratios of at least yttrium and aluminum in the YAG precursor microparticle can be made 80% or more and 120% or less relative to the molar ratios of yttrium ion and aluminum ion in the mixed thin film fluid. Further, in the present invention, the YAG precursor microparticle is made to the YAG microparticle by subjecting the former to the heat treatment, in the way that the molar ratios of at least yttrium and aluminum in the YAG microparticle can be made within ±20% relative to the molar ratios of yttrium ion and aluminum ion in the mixed thin film fluid. In other words, if each of the molar ratios of yttrium ion and aluminum ion in the mixed thin film fluid is made 1, the molar ratios of at least yttrium and aluminum in the YAG microparticle can be made 80% or more and 120% or less relative to the molar ratios of yttrium ion to aluminum ion in the mixed thin film fluid.

The measurement method of the respective element amounts to calculate the molar ratios of at least two elements in the YAG precursor microparticle and the molar ratios of at least two elements in the YAG microparticle is not particularly restricted. Illustrative example thereof includes the energy dispersive X-ray spectroscopy under observation with the transmission electron microscope (TEM-EDS), the energy dispersive X-ray spectroscopy under observation with the scanning electron microscope (SEM-EDS), the high resolution TEM (HRTEM), the high-angle annular dark-field scanning transmission electron microscopy (HAADF-STEM), the energy dispersive X-ray spectroscopy under observation with the scanning transmission electron microscopy (STEM-EDS), and the electron energy loss spectroscopy (EELS). In addition, elementary analysis using the atomic absorption spectrometric analysis, the X-ray fluorescence elemental analysis, the inductively coupled plasma atomic emission spectrophotometry (ICP analysis), and the like may be used. Measurement method of the respective elements to calculate the molar ratios of at least two element ions introduced into the thin film fluid is not particularly restricted so that the methods mentioned above may also be used.

By carrying out the present invention, it is thought that the homogeneous YAG precursor microparticle and the homogeneous YAG microparticle can be produced. More specifically, as shown in Examples, by controlling the pH of the thin film fluid after the mixing in the range of 7.0 to 10.0, the molar ratios of at least yttrium and aluminum obtained by the ICP analysis in the YAG precursor microparticle could be made within ±20% relative to the molar ratios of yttrium ion and aluminum ion obtained by the ICP analysis in the mixed thin film fluid. Also, as shown in Examples, by controlling the pH of the thin film fluid after the mixing in the range of 7.0 to 10.0, the molar ratios of at least yttrium and aluminum obtained by the TEM-EDS analysis in the YAG microparticle could be made within ±20% relative to the molar ratios of yttrium ion and aluminum ion obtained by the ICP analysis in the mixed thin film fluid.

YAG Microparticle:

The microparticle having a garnet structure of the present invention is the microparticle having a garnet structure whose chemical formula is shown by $M1_3M2_5O_{12}$. In the microparticle having a garnet structure, when the YAG microparticle contains as its constituent elements at least yttrium (Y) and aluminum (Al), and when M1 is yttrium (Y) and M2 is aluminum (Al), it is the general YAG microparticle shown by $Y_3Al_5O_{12}$. The YAG microparticle also includes a garnet whose part of Y is replaced by other element M1 thereby represented by $M1_xY_{3-x}Al_5O_{12}$, a garnet whose part of Al is replaced by other element M2 thereby represented by $Y_3M2_yAl_{5-y}O_{12}$, a garnet such as $M1_xY_{3-x}M2_yAl_{5-y}O_{12}$, and a garnet whose all of Y or Al are replaced by M1 or M2 thereby represented by $M1_3Al_5O_{12}$ or $Y_3M2_5O_{12}$. Hereunder, the YAG microparticle of the present invention shall include also microparticles having garnet structures not containing Y and Al.

The elements that can be used as M1 and M2 are not particularly restricted, so that any element that can form the garnet structure when it is combined therein may be used. Illustrative example thereof includes those having chemical formulae of $Gd_3Ga_5O_{12}$, $Gd_3Sc_2Ga_3O_{12}$, $Yb_3Al_5O_{12}$, $Lu_3Al_5O_{12}$, $Er_3Al_5O_{12}$, and $Y_3Sc_2Al_3O_{12}$.

In the present invention, even when a metal other than Y and Al is used as the at least two element ions, not only the crystal system is all the same, but also the fact that the separation condition in the thin film fluid is common; and thus, it is thought that each of the molar ratios of the at least two elements in the garnet precursor microparticle can be controlled by controlling the pH of the thin film fluid after the mixing.

YAG Precursor Microparticle:

The garnet precursor microparticle of the present invention is a precursor of the microparticle having a garnet structure. The YAG precursor microparticle of the present invention is the precursor of the above-mentioned YAG microparticle, wherein by subjecting the YAG precursor microparticle to heat treatment as mentioned later, the YAG microparticle can be obtained. Hereunder, the YAG precursor microparticle of the present invention shall include a precursor of the microparticle having a garnet structure not containing Y and Al. The YAG precursor microparticle is a microparticle of a substance having at least M1, M2, and oxygen (O) contained in the garnet structure. The YAG precursor microparticle is not particularly restricted, while illustrative example thereof includes various compounds which contain the afore-mentioned elements (M1 and M2), especially those compounds present as a compound which contains oxygen, an oxide, a hydroxide, a peroxide, a hydroxylated oxide, a super oxide, or a mixture of them. Moreover, the foregoing YAG precursor microparticle includes a solvate thereof with water or an organic solvent. Illustrative example thereof includes an oxide with the formula of $M_xO_y$, a hydroxide with the formula of $M_p(OH)_q$, a hydroxylated oxide with the formula of $M_r(OH)_sO_t$, a solvate form of them, and a composition which contains these compounds as a main component (in the formulae, M represents M1 and/or M2, and x, y, p, q, r, s, and t each represents an arbitrary number).

Dope Elements:

As the element to constitute the YAG microparticle and the YAG precursor microparticle, for a doping purpose, the YAG microparticle and the YAG precursor microparticle may contain an element other than those elements to constitute the chemical formula of the garnet structure. The element for the purpose of doping is not particularly restricted, so that all elements in the periodical table may be used except for oxygen, though all metal elements in the periodical table are preferable. Beside these metal elements, in the present invention, non-metal elements represented by H, B, Si, Ge, As, Sb, C, N, S, Te, Se, F, Cl, Br, I, and At may be used. These metal elements and non-metal elements may be used solely or as a combination of a plurality of these elements. Preferable example thereof includes lanthanide elements, chromium, hydrogen, and fluorine.

Raw Material:

In the present invention, by mixing at least two element ions with a basic substance in the thin film fluid formed between the processing surfaces, the YAG precursor microparticle which contains the said at least two elements can be separated. Hereunder, the at least two element ions shall be used as the ions of the elements to constitute the YAG precursor microparticle. The raw material for the ions of the elements to constitute the YAG precursor microparticle is not particularly restricted, though a single body of the element to constitute the YAG precursor microparticle and/or a compound thereof may be mentioned. In the case that the element to constitute the YAG precursor microparticle is a metal element, the raw material thereof is a metal and/or a metal compound. Although the compound of the foregoing elements is not particularly restricted, illustrative example includes a salt, an oxide, a hydroxide, a hydroxylated oxide, a nitride, a carbide, a complex, an organic salt, an organic complex, an organic compound and hydrate of them, and an organic solvate, provided that all these compounds contain the foregoing elements. Although there is no particular restriction in the salt of the foregoing elements, illustrative example thereof includes a nitrate salt, a nitrite salt, a sulfate salt, a sulfite salt, a formate salt, an acetate salt, a phosphate salt, an phosphite salt, a hypophosphite salt, a chloride, an oxy salt, an acetylacetonato salt, a hydrate of these salts, and an organic solvate, provided that all these salts contain the foregoing elements. Illustrative example of the organic compound includes an alkoxide of the foregoing elements. Single bodies and compounds formed of the elements to constitute the YAG precursor microparticle may be used solely or as a mixture of two or more of them.

In the present invention, preferred embodiments are executed as a fluid which contains the ions of the elements to constitute the YAG precursor microparticle, and as a fluid which contains at least a single body formed of the element and/or a compound thereof so that they may be used as the raw material. At this time, the said fluid is preferably used in the state of the single body formed of the element and/or the compound thereof, wherein they are mixed with or dissolved in a later-mentioned solvent. By so doing, the invention may be executed as the fluid which contains the ions of the elements to constitute the YAG precursor microparticle. In the present invention, the fluid which contains the ions of the elements to constitute the YAG precursor microparticle may be used in the state including a dispersion solution and a slurry solution. In the present invention, the state of ions of the foregoing elements is not particularly restricted; and thus, any of the states, i.e., a single atom ion state, a multi-atom ion state, and a complex ion state, may be allowed.

Basic Substance and Basic Fluid:

The basic substance to be used in the present invention is not particularly restricted; and illustrative example thereof includes ammonias and amines; and a hydroxide of metal and non-metal, a carbonate salt, a hydrogen carbonate salt, and an alkoxide. In addition, hydrazine and hydrazine monohydrate may also be mentioned. The basic substances mentioned above include a hydrate, an organic solvate, and an anhydride of them. These basic substances may be used solely or as a mixture of two or more of them.

In the present invention, a fluid which contains at least one basic substance mentioned above is preferably used as the basic fluid. In the case that the above-mentioned basic substance is in the solid state, to use it in the molten state, or in the mixed state or in the dissolved state with a solvent, is preferable. Alternatively, the basic fluid may be used in the state including a dispersion solution and a slurry solution.

Solvents:

The solvent to be used in the present invention is not particularly restricted; and illustrative example thereof includes water such as an ion-exchanged water, a RO water, a pure water, and a ultrapure water; alcoholic organic solvents such as methanol and ethanol; polyol organic solvents (polyvalent alcohols) such as ethylene glycol, propylene glycol, trimethylene glycol, triethylene glycol, polyethylene glycol, and glycerin; ketonic organic solvents such as acetone and methyl ethyl ketone; ester organic solvents such as ethyl acetate and butyl acetate; ether organic solvents such as dimethyl ether and dibutyl ether; aromatic organic solvents such as benzene, toluene, and xylene; and aliphatic hydrocarbon organic solvents such as hexane and pentane. These solvents each may be used singly or as a mixture of two or more of them.

Fluid Processing Apparatus:

In the present invention, the YAG precursor microparticle may be separated by mixing the ions of the elements to constitute the YAG precursor microparticle with a basic substance; and in this case, it is preferable to separate the YAG precursor microparticle by mixing a fluid which contains the ions of the elements to constitute the YAG precursor microparticle with a basic fluid which contains at least one basic substance. In that case, the mixing is carried out by a method in which homogeneous stirring with mixing is done in the thin film fluid formed between the processing surfaces which are disposed in the position they are faced with each other so as to be able to approach to and separate from each other, at least one of which rotate relative to the other; and thus, for example, it is preferable to separate the YAG precursor microparticle to mix by using a fluid processing apparatus based on the same principal as that of the apparatus shown in Patent Document 4 filed by the Applicant of the present invention. By using the apparatus based on the principle as mentioned above, not only the YAG precursor microparticle having the molar ratios of the constituent elements controlled precisely can be obtained, but also the YAG microparticle having higher homogeneity and uniformity than those obtained by conventional methods can be obtained by subjecting the YAG precursor microparticle to the later-mentioned heat treatment for converting it to the YAG microparticle.

Hereinafter, embodiments of the above-mentioned fluid processing apparatus will be explained by using the drawings.

Figure 2:
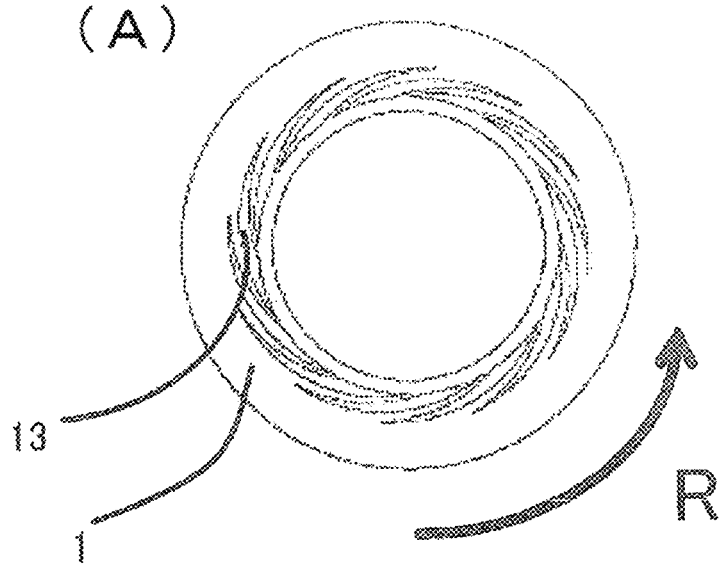
FIG. 2(A) is a schematic plane view of the first processing surface in the fluid processing apparatus shown in FIG. 1.
FIG. 2(B) is an enlarged view showing an important part of the processing surface in the apparatus.
Figure 2:
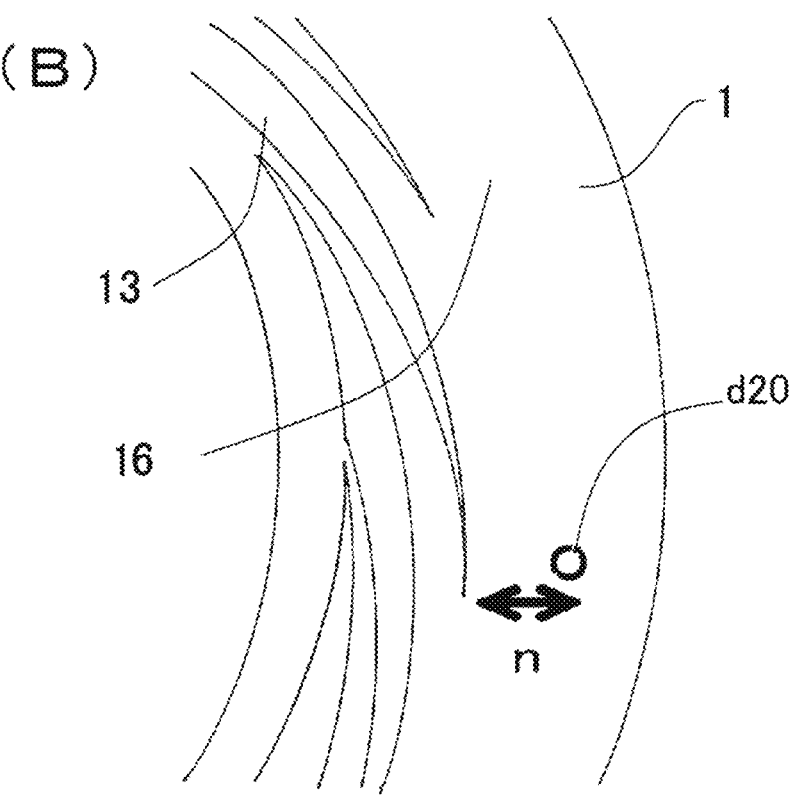
Figure 3:
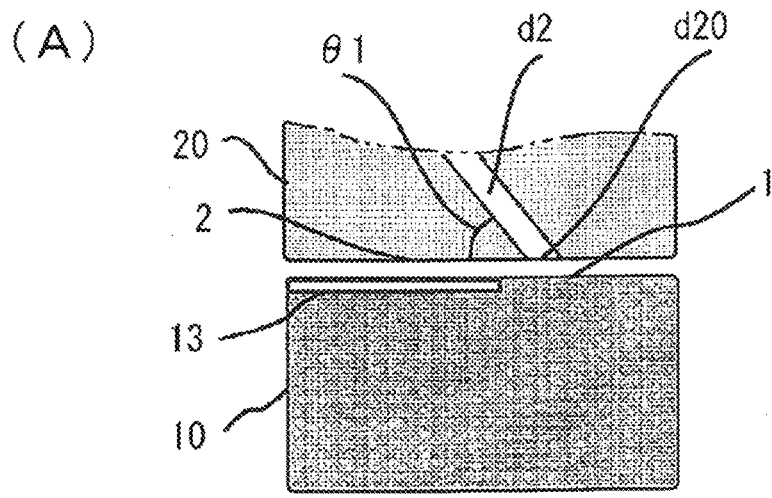
FIG. 3(A) is a sectional view of the second introduction member of the apparatus.
FIG. 3(B) is an enlarged view showing an important part of the processing surface for explaining the second introduction member.
Figure 3:
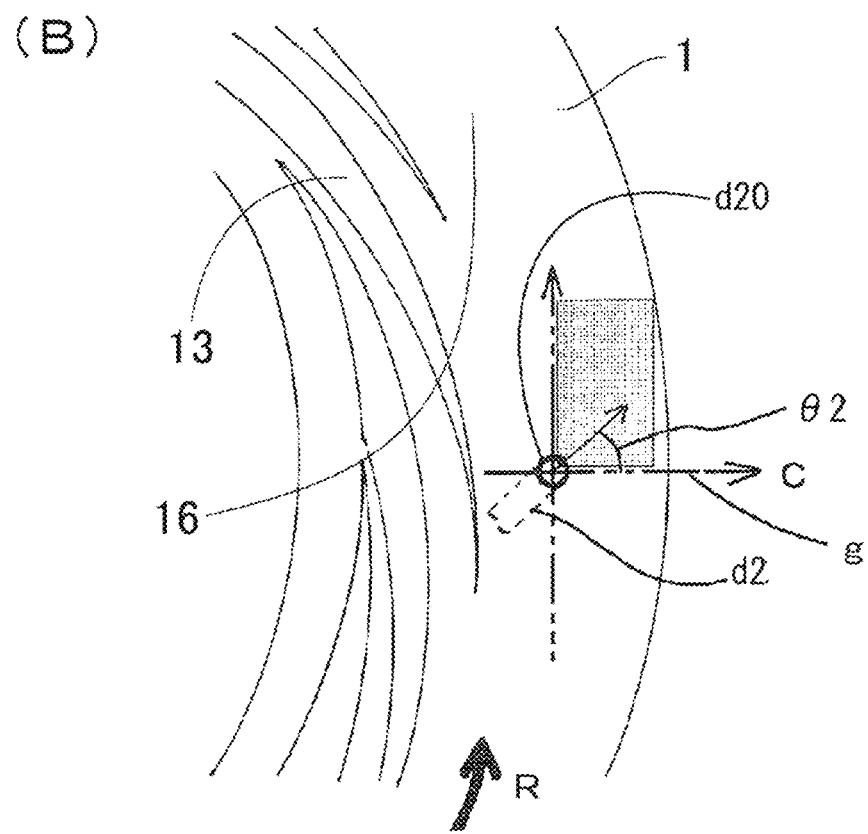

The fluid processing apparatus shown in FIG. 1 to FIG. 3 is similar to the apparatus described in Patent Document 4, with which a material to be processed is processed between processing surfaces in processing members arranged so as to be able to approach to and separate from each other, at least one of which rotates relative to the other; wherein, of the fluids to be processed, a first fluid to be processed, i.e., a first fluid, is introduced into between the processing surfaces, and a second fluid to be processed, i.e., a second fluid, is introduced into between the processing surfaces from a separate path that is independent of the flow path introducing the first fluid and has an opening leading to between the processing surfaces, whereby the first fluid and the second fluid are mixed and stirred between the processing surfaces. Meanwhile, in FIG. 1, a reference character U indicates an upside and a reference character S indicates a downside; however, up and down, front and back and right and left shown therein indicate merely a relative positional relationship and does not indicate an absolute position. In FIG. 2(A) and FIG. 3(B), reference character R indicates a rotational direction. In FIG. 3(C), reference character C indicates a direction of centrifugal force (a radial direction).

In this apparatus provided with processing surfaces arranged opposite to each other so as to be able to approach to and separate from each other, at least one of which rotates relative to the other, at least two kinds of fluids as fluids to be processed are used, wherein at least one fluid thereof contains at least one kind of material to be processed, a thin film fluid is formed by converging the respective fluids between these processing surfaces, and the material to be processed is processed in this thin film fluid. With this apparatus, a plurality of fluids to be processed may be processed as mentioned above; but a single fluid to be processed may be processed as well.

This fluid processing apparatus is provided with two processing members of a first processing member 10 and a second processing member 20 arranged opposite to each other, wherein at least one of these processing members rotates. The surfaces arranged opposite to each other of the respective processing members 10 and 20 are made to be the respective processing surfaces. The first processing member 10 is provided with a first processing surface 1 and the second processing member 20 is provided with a second processing surface 2.

The processing surfaces 1 and 2 are connected to a flow path of the fluid to be processed and constitute part of the flow path of the fluid to be processed. Distance between these processing surfaces 1 and 2 can be changed as appropriate; and thus, the distance thereof is controlled so as to form a minute space usually in the range of 1 mm or less, for example, 0.1 □m to 50 □m. With this, the fluid to be processed passing through between the processing surfaces 1 and 2 becomes a forced thin film fluid forced by the processing surfaces 1 and 2.

When a plurality of fluids to be processed are processed by using this apparatus, the apparatus is connected to a flow path of the first fluid to be processed whereby forming part of the flow path of the first fluid to be processed; and part of the flow path of the second fluid to be processed other than the first fluid to be processed is formed. In this apparatus, the two paths converge into one, and two fluids to be processed are mixed between the processing surfaces 1 and 2 so that the fluids may be processed by reaction and so on. It is noted here that the term "process(ing)" includes not only the embodiment wherein a material to be processed is reacted but also the embodiment wherein a material to be processed is only mixed or dispersed without accompanying reaction.

To specifically explain, this apparatus is provided with a first holder 11 for holding the first processing member 10, a second holder 21 for holding the second processing member 20, a surface-approaching pressure imparting mechanism, a rotation drive mechanism, a first introduction part d1, a second introduction part d2, and a fluid pressure imparting mechanism p.

As shown in FIG. 2(A), in this embodiment, the first processing member 10 is a circular body, specifically a disk with a ring form. Similarly, the second processing member 20 is a circular disk. Material of the processing members 10 and 20 is not only metal and carbon but also ceramics, sintered metal, abrasion-resistant steel, sapphire, and other metal subjected to hardening treatment, and rigid material subjected to lining, coating, or plating. In the processing members 10 and 20 of this embodiment, at least part of the first and the second surfaces 1 and 2 arranged opposite to each other is mirror-polished.

Roughness of this mirror polished surface is not particularly limited; but surface roughness Ra is preferably 0.01 µm to 1.0 µm, or more preferably 0.03 µm to 0.3 µm.

At least one of the holders can rotate relative to the other holder by a rotation drive mechanism such as an electric motor (not shown in drawings). A reference numeral 50 in FIG. 1 indicates a rotary shaft of the rotation drive mechanism; in this embodiment, the first holder 11 attached to this rotary shaft 50 rotates, and thereby the first processing member 10 attached to this first holder 11 rotates relative to the second processing member 20. As a matter of course, the second processing member 20 may be made to rotate, or the both may be made to rotate. Further in this embodiment, the first and second holders 11 and 21 may be fixed, while the first and second processing members 10 and 20 may be made to rotate relative to the first and second holders 11 and 21.

At least any one of the first processing member 10 and the second processing member 20 is able to approach to and separate from at least any other member, thereby the processing surfaces 1 and 2 are able to approach to and separate from each other.

In this embodiment, the second processing member 20 approaches to and separates from the first processing member 10, wherein the second processing member 20 is accepted in an accepting part 41 arranged in the second holder 21 so as to be able to rise and set. However, as opposed to the above, the first processing member 10 may approach to and separate from the second processing member 20, or both the processing members 10 and 20 may approach to and separate from each other.

This accepting part 41 is a concave portion for mainly accepting that side of the second processing member 20 opposite to the second processing surface 2, and this concave portion is a groove being formed into a circle, i.e., a ring when viewed in a plane. This accepting part 41 accepts the second processing member 20 with sufficient clearance so that the second processing member 20 may rotate. Meanwhile, the second processing member 20 may be arranged so as to be movable only parallel to the axial direction; alternatively, the second processing member 20 may be made movable, by making this clearance larger, relative to the accepting part 41 so as to make the center line of the processing member 20 inclined, namely unparallel, to the axial direction of the accepting part 41, or movable so as to depart the center line of the processing member 20 and the center line of the accepting part 41 toward the radius direction.

It is preferable that the second processing member 20 be accepted by a floating mechanism so as to be movable in the three dimensional direction, as described above.

The fluids to be processed are introduced into between the processing surfaces 1 and 2 from the first introduction part d1 and the second introduction part d2, the flow paths through which the fluids flow, under the state that pressure is applied thereto by a fluid pressure imparting mechanism p consisting of various pumps, potential energy, and so on. In this embodiment, the first introduction part d1 is a path arranged in the center of the circular, second holder 21, and one end thereof is introduced into between the processing surfaces 1 and 2 from inside the circular, processing members 10 and 20. Through the second introduction part d2, the first fluid to be processed and the second fluid to be processed for reaction are introduced into between the processing surfaces 1 and 2. In this embodiment, the second introduction part d2 is a path arranged inside the second processing member 20, and one end thereof is open at the second processing surface 2. The first fluid to be processed which is pressurized with the fluid pressure imparting mechanism p is introduced from the first introduction part d1 to the space inside the processing members 10 and 20 so as to pass through between the first and processing surfaces 1 and 2 to outside the processing members 10 and 20. From the second introduction part d2, the second fluid to be processed which is pressurized with the fluid pressure imparting mechanism p is provided into between the processing surfaces 1 and 2, whereat this fluid is converged with the first fluid to be processed, and there, various fluid processing such as mixing, stirring, emulsification, dispersion, reaction, deposition, crystallization, and separation are effected, and then the fluid thus processed is discharged from the processing surfaces 1 and 2 to outside the processing members 10 and 20. Meanwhile, an environment outside the processing members 10 and 20 may be made negative pressure by a vacuum pump.

The surface-approaching pressure imparting mechanism mentioned above supplies the processing members with force exerting in the direction of approaching the first processing surface 1 and the second processing surface 2 each other. In this embodiment, the surface-approaching pressure imparting mechanism is arranged in the second holder 21 and biases the second processing member 20 toward the first processing member 10.

The surface-approaching pressure imparting mechanism is a mechanism to generate force (hereinafter, surface-approaching pressure) to press the first processing surface 1 of the first processing member 10 and the second processing surface 2 of the second processing member 20 in the direction to make them approach to each other. The mechanism generates a thin film fluid having minute thickness in a level of nanometer or micrometer by the balance between the surface-approaching pressure and the force to separate the processing surfaces 1 and 2 from each other, i.e., the force such as the fluid pressure. In other words, the distance between the processing surfaces 1 and 2 is kept in a predetermined minute distance by the balance between these forces.

In the embodiment shown in FIG. 1, the surface-approaching pressure imparting mechanism is arranged between the accepting part 41 and the second processing member 20. Specifically, the surface-approaching pressure imparting mechanism is composed of a spring 43 to bias the second processing member 20 toward the first processing member 10 and a biasing-fluid introduction part 44 to introduce a biasing fluid such as air and oil, wherein the surface-approaching pressure is provided by the spring 43 and the fluid pressure of the biasing fluid. The surface-approaching pressure may be provided by any one of this spring 43 and the fluid pressure of this biasing fluid; and other forces such as magnetic force and gravitation may also be used. The second processing member 20 recedes from the first processing member 10 thereby making a minute space between the processing surfaces by separating force, caused by viscosity and the pressure of the fluid to be processed applied by the fluid pressure imparting mechanism p, against the bias of this surface-approaching pressure imparting mechanism. By this balance between the surface-approaching pressure and the separating force as mentioned above, the first processing surface 1 and the second processing surface 2 can be set with the precision of a micrometer level; and thus the minute space between the processing surfaces 1 and 2 may be set. The separating force mentioned above includes fluid pressure and viscosity of the fluid to be processed, centrifugal force by rotation of the processing members, negative pressure when negative pressure is applied to the biasing-fluid introduction part 44, and spring force when the spring 43 works as a pulling spring. This surface-approaching pressure imparting mechanism may be arranged also in the first processing member 10, in place of the second processing member 20, or in both the processing members.

To specifically explain the separation force, the second processing member 20 has the second processing surface 2 and a separation controlling surface 23 which is positioned inside the processing surface 2 (namely at the entering side of the fluid to be processed into between the first and second processing surfaces 1 and 2) and next to the second processing surface 2. In this embodiment, the separation controlling surface 23 is an inclined plane, but may be a horizontal plane. The pressure of the fluid to be processed acts to the separation controlling surface 23 to generate force directing to separate the second processing member 20 from the first processing member 10. Therefore, the second processing surface 2 and the separation controlling surface 23 constitute a pressure receiving surface to generate the separation force.

In the example shown in FIG. 1, an approach controlling surface 24 is formed in the second processing member 20. This approach controlling surface 24 is a plane opposite, in the axial direction, to the separation controlling surface 23 (upper plane in FIG. 1) and, by action of pressure applied to the fluid to be processed, generates force of approaching the second processing member 20 toward the first processing member 10.

Meanwhile, the pressure of the fluid to be processed exerted on the second processing surface 2 and the separation controlling surface 23, i.e., the fluid pressure, is understood as force constituting an opening force in a mechanical seal. The ratio (area ratio A1/A2) of a projected area A1 of the approach controlling surface 24 projected on a virtual plane perpendicular to the direction of approaching and separating the processing surfaces 1 and 2, that is, in the direction of rising and setting of the second processing member 20 (axial direction in FIG. 1), to a total area A2 of the projected area of the second processing surface 2 of the second processing member 20 and the separation controlling surface 23 projected on the virtual plane is called as balance ratio K, which is important for control of the opening force. This opening force can be controlled by the pressure of the fluid to be processed, i.e., the fluid pressure, by changing the balance line, i.e., by changing the area A1 of the approach controlling surface 24.

Sliding surface actual surface pressure P, i.e., the fluid pressure out of the surface-approaching pressures, is calculated according to the following equation:

$$P = P1 \times (K-k) + Ps$$

Here, P1 represents the pressure of a fluid to be processed, i.e., the fluid pressure, K represents the balance ratio, k represents an opening force coefficient, and Ps represents a spring and back pressure.

By controlling this balance line to control the sliding surface actual surface pressure P, the space between the processing surfaces 1 and 2 is formed as a desired minute space, thereby forming a fluid film of the fluid to be processed so as to make the processed substance such as a product fine and to effect uniform processing by reaction.

Meanwhile, the approach controlling surface 24 may have a larger area than the separation controlling surface 23, though this is not shown in the drawing.

The fluid to be processed becomes a forced thin film fluid by the processing surfaces 1 and 2 that keep the minute space therebetween, whereby the fluid is forced to move out from the circular, processing surfaces 1 and 2. However, the first processing member 10 is rotating; and thus, the mixed fluid to be processed does not move linearly from inside the circular, processing surfaces 1 and 2 to outside thereof, but does move spirally from the inside to the outside thereof by a resultant vector acting on the fluid to be processed, the vector being composed of a moving vector toward the radius direction of the circle and a moving vector toward the circumferential direction.

Meanwhile, a rotary shaft 50 is not only limited to be placed vertically, but may also be placed horizontally, or at a slant. This is because the fluid to be processed is processed in a minute space between the processing surfaces 1 and 2 so that the influence of gravity can be substantially eliminated. In addition, this surface-approaching pressure imparting mechanism can function as a buffer mechanism of microvibration and rotation alignment by concurrent use of the foregoing floating mechanism with which the second processing member 20 may be held displaceably.

In the first and second processing members 10 and 20, the temperature thereof may be controlled by cooling or heating at least any one of them; in FIG. 1, an embodiment having temperature regulating mechanisms J1 and J2 in the first and second processing members 10 and 20 is shown. Alternatively, the temperature may be regulated by cooling or heating the introducing fluid to be processed. These temperatures may be used to separate the processed substance or may be set so as to generate Benard convection or Marangoni convection in the fluid to be processed between the first and second processing surfaces 1 and 2.

As shown in FIG. 2, in the first processing surface 1 of the first processing member 10, a groove-like depression 13 extended toward an outer side from the central part of the first processing member 10, namely in a radius direction, may be formed. The depression 13 may be, as a plane view, curved or spirally extended on the first processing surface 1 as shown in FIG. 2(B), or, though not shown in the drawing, may be extended straight radially, or bent at a right angle, or jogged; and the concave portion may be continuous, intermittent, or branched. In addition, this depression 13 may be formed also on the second processing surface 2, or on both the first and second processing surfaces 1 and 2. By forming the depression 13 as mentioned above, the micro-pump effect can be obtained so that the fluid to be processed may be sucked into between the first and second processing surfaces 1 and 2.

It is preferable that the base edge of this depression 13 reach the inner periphery of the first processing member 10. The front edge of the depression 13 is extended to the direction of the outer periphery of the first processing surface 1; the depth thereof (cross section area) is made gradually shallower (smaller) from the base edge to the front edge.

Between the front edge of the depression 13 and the outer peripheral of the first processing surface 1 is formed the flat plane 16 not having the depression 13.

When an opening d20 of the second introduction part d2 is arranged in the second processing surface 2, the arrangement is done preferably at a position opposite to the flat surface 16 of the first processing surface 1 arranged at a position opposite thereto.

This opening d20 is arranged preferably in the downstream (outside in this case) of the depression 13 of the first processing surface 1. The opening is arranged especially preferably at a position opposite to the flat surface 16 located nearer to the outer diameter than a position where the direction of flow upon introduction by the micro-pump effect is changed to the direction of a spiral and laminar flow formed between the processing surfaces. Specifically, in FIG. 2(B), a distance n from the outermost side of the depression 13 arranged in the first processing surface 1 in the radial direction is preferably about 0.5 mm or more. Especially in the case of separating microparticles from a fluid, it is preferable that mixing of a plurality of fluids to be processed and separation of the microparticles therefrom be effected under the condition of a laminar flow. Form of the opening d20 may be a circular form as shown in FIG. 2(B) and FIG. 3(B); or a concentric circular ring surrounding the central opening of the processing surface 2 which is a ring-shape disk (this is not shown by drawing). Further, if the opening is in the form of a circular ring, this circular ring opening may be continuous or discontinuous.

This second introduction part d2 may have directionality. For example, as shown in FIG. 3(A), the direction of introduction from the opening d20 of the second processing surface 2 is inclined at a predetermined elevation angle ($\theta 1$) relative to the second processing surface 2. The elevation angle ($\theta 1$) is set at more than 0° and less than 90°, and when the reaction speed is high, the angle ($\theta 1$) is preferably set in the range of 1° to 45°.

In addition, as shown in FIG. 3(B), introduction from the opening d20 of the second processing surface 2 has directionality in a plane along the second processing surface 2. The direction of introduction of this second fluid is in the outward direction departing from the center in a radial component of the processing surface and in the forward direction in a rotation component of the fluid between the rotating processing surfaces. In other words, a predetermined angle ($\theta 2$) exists facing the rotation direction R from a reference line g, which is the line to the outward direction and in the radial direction passing through the opening d20. This angle ($\theta 2$) is also set preferably at more than 0° and less than 90°.

This angle ($\theta 2$) can vary depending on various conditions such as the type of fluid, the reaction speed, viscosity, and the rotation speed of the processing surface. In addition, it is also possible not to give the directionality to the second introduction part d2 at all.

In the embodiment shown in FIG. 1, kinds of the fluid to be processed and numbers of the flow path thereof are set two respectively; but they may be one, or three or more. In the embodiment shown in FIG. 1, the second fluid is introduced into between the processing surfaces 1 and 2 from the introduction part d2; but this introduction part may be arranged in the first processing member 10 or in both. Alternatively, a plurality of introduction parts may be arranged relative to one fluid to be processed. The opening for introduction arranged in each processing member is not particularly restricted in its form, size, and number; and these may be changed as appropriate. The opening for introduction may be arranged just before the first and second processing surfaces 1 and 2 or in the side of further upstream thereof.

Meanwhile, because it is good enough only if the reaction could be effected between the processing surfaces 1 and 2, as opposed to the foregoing method, a method wherein the second fluid is introduced from the first introduction part d1 and a solution containing the first fluid is introduced from the second introduction part d2 may also be used. That is, the expression "first" or "second" for each fluid has a meaning for merely discriminating an $n^{th}$ fluid among a plurality of the fluids present; and therefore, a third or more fluids can also exist.

In the above-mentioned fluid processing apparatus, a treatment such as separation/precipitation and crystallization is effected while the fluids are being mixed forcibly and uniformly between the processing surfaces 1 and 2 which are disposed in a position they are faced with each other so as to be able to approach to and separate from each other, at least one of which rotates relative to the other, as shown in FIG. 1. Particle diameter and monodispersity of the treated substance to be processed can be controlled by appropriately controlling rotation speed of the processing members 10 and 20, distance between the processing surfaces 1 and 2, concentration of raw materials in the fluids to be processed, kind of solvents in the fluids to be processed, and so forth.

Hereunder, specific embodiments as to the method for producing YAG precursor microparticle by using the above-mentioned fluid processing apparatus will be explained.

In the fluid processing apparatus shown above, a fluid which contains the ions of the elements to constitute the YAG precursor microparticle and a basic fluid which contains at least one basic substance are mixed as the fluids to be processed in the thin film fluid formed between the processing surfaces 1 and 2 which are disposed in a position they are faced with each other so as to be able to approach to and separate from each other, at least one of which rotates relative to the other, whereby separating the YAG precursor microparticle. At this time, by controlling the pH of the thin film fluid after the mixing of the fluid which contains the ions of the elements to constitute the YAG precursor microparticle with the basic fluid, the both fluids being introduced into between the processing surfaces 1 and 2, the molar ratios of the constituent elements, at least the molar ratios of M1 and M2, the elements to constitute the garnet structure, in the YAG precursor microparticle to be separated and in the later-mentioned YAG microparticle is controlled. In the case when at least yttrium (Y) and aluminum (Al) are contained as the constituent elements in the YAG precursor microparticle to be separated, at least molar ratios of Y and Al in the YAG precursor microparticle and in the later-mentioned YAG microparticle which is obtained after the heat-treatment are controlled.

The reaction to separate the YAG precursor microparticle takes place in the fluid processing apparatus as shown in FIG. 1 of the present application while the fluids are being mixed forcibly and uniformly between the processing surfaces 1 and 2 which are disposed in a position they are faced with each other so as to be able to approach to and separate from each other, at least one of which rotates relative to the other.

At first, the basic fluid in which at least one basic substance is contained is introduced as the first fluid from the first introduction part d1, which is one flow path, into between the processing surfaces 1 and 2 which are disposed in a position they are faced with each other so as to be able to approach to and separate from each other, at least one of which rotates relative to the other, thereby forming between the processing surfaces a first fluid film which is a thin film fluid formed of the first fluid.

Then, the fluid in which contains element ion to constitute the YAG precursor microparticle is introduced as the second fluid directly into the first fluid film formed between the processing surfaces 1 and 2 from the second introduction part d2 which is another flow path.

By so doing, the first fluid and the second fluid are mixed between the processing surfaces 1 and 2 while the distance therebetween is fixed by pressure balance between the supply pressure of the fluids to be processed and the pressure that is applied between the rotating processing surfaces, thereby effecting the reaction to separate the YAG precursor microparticle.

Meanwhile, because it is good enough only if the reaction could be effected between the processing surfaces 1 and 2, as opposed to the foregoing method, a method wherein the second fluid is introduced from the first introduction part d1 and a solution containing the first fluid is introduced from the second introduction part d2 may also be used. That is, the expression "first" or "second" for each fluid has a meaning for merely discriminating an $n^{th}$ fluid among a plurality of the fluids present; and therefore, a third or more fluids can also exist.

As mentioned before, the fluid processing apparatus may be provided with, in addition to the first introduction part d1 and the second introduction part d2, the third introduction part d3; and in this case, for example, each of the fluids which contain a later-mentioned pH-controlling agent may be introduced into the fluid processing apparatus as the first fluid, the second fluid, and the third fluid. By so doing, concentration and pressure of each fluid can be controlled separately so that the separation reaction and the stability of particle diameter of microparticles may be controlled more precisely. Meanwhile, a combination of the fluids to be processed (first to third fluids) that are introduced into each of the introduction parts may be set arbitrarily. The same is applied if the fourth or more introduction parts are arranged; and by so doing, fluids to be introduced into the fluid processing apparatus may be subdivided. In this case, the pH-controlling agent may be contained at least in the third fluid, at least in either one of the first fluid or the second fluid, or neither in the first fluid nor the second fluid.

Figure 4:
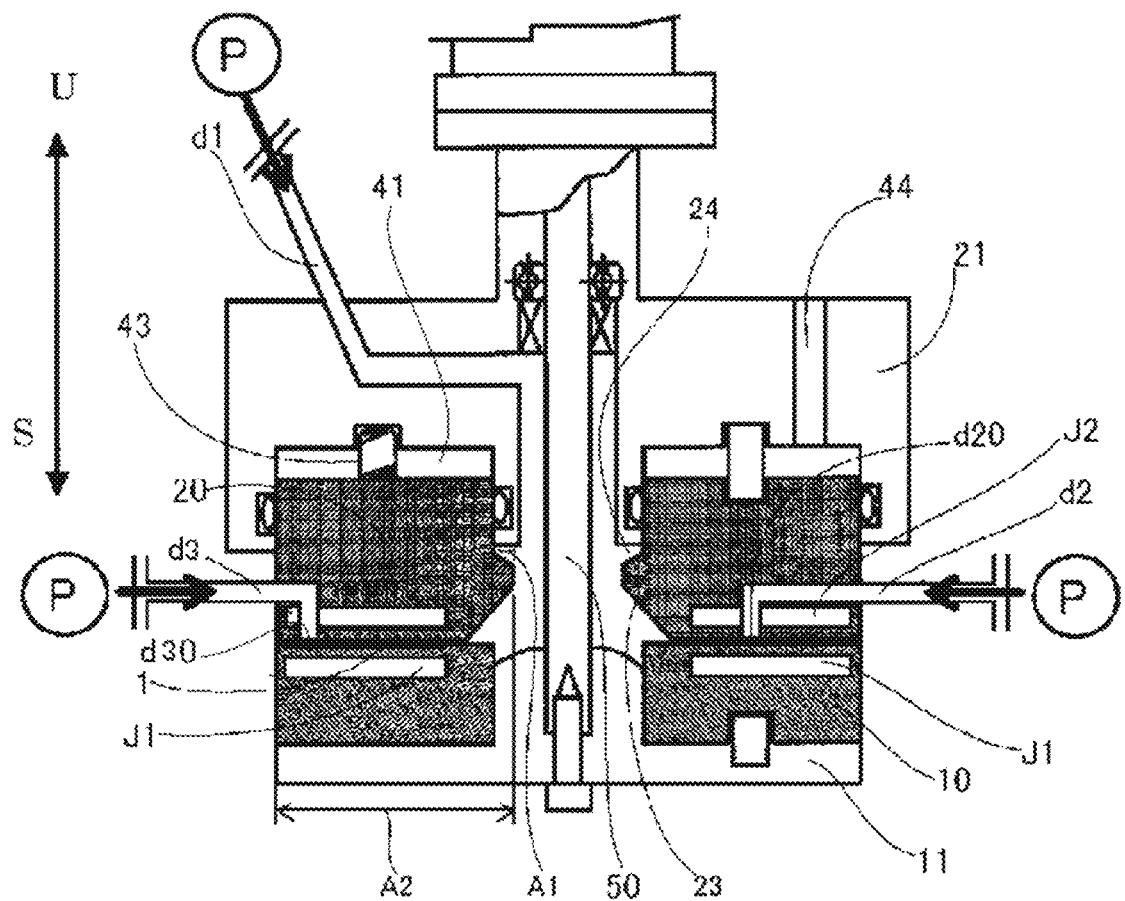
FIG. 4 is a schematic sectional view showing the fluid processing apparatus according to other embodiment of the present invention.

Alternatively, the fluid processing apparatus may be provided with, in addition to the first introduction part d1 and the second introduction part d2, the third introduction part d3; and in this case, for example, each of the fluids which contains at least one element ion of element ions to constitute a YAG precursor microparticle as the first fluid, the fluid which contains a element ion other than the element ion to constitute a YAG precursor microparticle contained in the first fluid, and the fluid which contains a basic fluid as the third fluid may be introduced into the fluid processing apparatus. By so doing, concentration and pressure of each fluid can be controlled separately so that the separation reaction and the stability of particle diameter of microparticles may be controlled more precisely. Meanwhile, a combination of the fluids to be processed (first to third fluids) that are introduced into each of the introduction parts may be set arbitrarily. The same is applied if the fourth or more introduction parts are arranged; and by so doing, fluids to be introduced into the fluid processing apparatus may be subdivided. In this case, it is preferable that the first fluid and the second fluid be joined together before joining with the third fluid which is a basic fluid. One example of the fluid processing apparatus provided with the third introduction part d3 is shown in FIG. 4. There is no restriction about the position of the opening d30 of the third introduction part d3.

In addition, temperatures of the fluids to be processed such as the first fluid and the second fluid may be controlled; and temperature difference among the first fluid, the second fluid, and so on (namely, temperature difference among each of the supplied fluids to be processed) may be controlled either. To control temperature and temperature difference of each of the supplied fluids to be processed, a mechanism with which temperature of each of the fluids to be processed is measured (temperature of the fluid before introduction to the processing apparatus, or in more detail, just before introduction into between the processing surfaces 1 and 2) so that each of the fluids to be processed that is introduced into between the processing surfaces 1 and 2 may be heated or cooled may be installed.

Control of pH:

In the present invention, at the time when the ions of the elements to constitute the YAG precursor microparticle and the basic substance are mixed in the thin film fluid formed between the processing surfaces 1 and 2 to separate the YAG precursor microparticle, by controlling the pH of the thin film fluid after the mixing, the molar ratios of the constituent elements in the YAG precursor microparticle can be readily controlled. In addition, when the YAG precursor microparticle having the molar ratios of the constituent elements thereof controlled is subjected to the heat-treatment as mentioned later, the YAG microparticle having the controlled molar ratios of the constituent elements can be obtained.

There is no particular restriction as to the method of controlling the pH of the thin film fluid after the mixing. As one example thereof, by changing the pH of at least any one of the fluid which contains the ions of the elements to constitute the YAG precursor microparticle and the basic fluid, the both fluids being introduced into between the processing surfaces 1 and 2, the pH of the thin film fluid after the mixing of the fluid which contains the ions of the elements to constitute the YAG precursor microparticle with the basic fluid, the both fluids being introduced into between the processing surfaces 1 and 2, is controlled, so that the molar ratios of the constituent elements in the YAG precursor microparticle to be obtained and in the YAG microparticle can be readily controlled. Specifically, the method is not particularly restricted; however, the pH may be changed by adding a later-mentioned pH-adjusting agent into at least any one of the fluid which contains the ions of the elements to constitute the YAG precursor microparticle and the basic fluid, or the pH may be changed by changing the concentration of a raw material contained in the fluid which contains the ions of the elements to constitute the YAG precursor microparticle or by changing the concentration of a basic substance contained in the basic fluid. Alternatively, the pH of the thin film fluid may be changed by a method in which a plurality of raw materials are added into the fluid which contains the ions of the elements to constitute the YAG precursor microparticle, or by a method in which a plurality of basic substances are added into the basic fluid, whereby changing the pH of at least any one of the fluid which contains the ions of the elements to constitute the YAG precursor microparticle and the basic fluid. By these methods to change the pH, the molar ratios of the constituent elements in the YAG precursor microparticle and in the YAG microparticle can be readily controlled, so that the YAG precursor microparticle and the YAG microparticle can be produced separately in accordance with an intended purpose.

Substances for pH Control:

As to the pH control substance to control pH, there is no particular restriction; and illustrative example thereof includes inorganic acidic substances such as hydrochloric acid, sulfuric acid, nitric acid, aqua regia; acidic substances including organic acid such as trichloroacetic acid, trifluoroacetic acid, phosphoric acid, citric acid, and ascorbic acid; metal hydroxides such as sodium hydroxide and potassium hydroxide; and amines such as triethylamine and dimethylaminoethanol, and a basic substance such as ammonia, and salts of the acidic substances and basic substances. The pH controlling agents each may be used singly or as a mixture of two or more of them. By changing the mixing amount of the pH controlling agent into any one of the fluid which contains the ions of the elements to constitute the YAG precursor microparticle and the basic fluid, or by changing concentration of any one of the fluid which contains the ions of the elements to constitute the YAG precursor microparticle and the basic fluid, pH of at least any one of the fluid which contains the ions of the elements to constitute the YAG precursor microparticle and the basic fluid can be changed.

The pH controlling agent may be included in the fluid which contains the ions of the elements to constitute the YAG precursor microparticle, or in the basic fluid, or in the both fluids. Alternatively, the pH controlling agent may be contained in a third fluid that is different from the fluid which contains the ions of the elements to constitute the YAG precursor microparticle and the basic fluid.

Region of pH:

In the present invention, at the time when the ions of the elements to constitute the YAG precursor microparticle are mixed with the basic substance in the thin film fluid formed between the processing surfaces 1 and 2 whereby separating the YAG precursor microparticle, the pH of the thin film fluid after the mixing is not particularly restricted; however, it is preferable to control the pH of the thin film fluid after the mixing in the range or 7.0 to 10.0, or more preferably in the range of 7.5 to 9.0. By controlling the pH of the thin film fluid after the mixing in the range or 7.0 to 10.0, the molar ratios of the constituent elements in the YAG precursor microparticle to be obtained and in the YAG microparticle can be made within ±20% relative to each of the molar ratios of the ions of the constituent elements in the YAG precursor microparticle in the mixed thin film fluid. By controlling the pH of the thin film fluid after the mixing in the range of 7.0 to 10.0, the molar ratios of the constituent elements, at least the molar ratios of M1 and M2, the elements to constitute the garnet structure, in the YAG precursor microparticle to be obtained and in the YAG microparticle can be made within ±20% relative to each of the molar ratios of the ions M1 and M2 contained in the fluid which contains the ions of the elements (M1 and M2) to constitute the YAG precursor microparticle. In the case of the YAG precursor microparticle and the YAG microparticle both of which contain at least yttrium (Y) and aluminum (Al) as the constituent elements therein, by controlling the pH of the thin film fluid after the mixing in the range of 7.0 to 10.0, the molar ratios of at least yttrium and aluminum in the YAG precursor microparticle to be obtained and in the YAG microparticle can be made within ±20% relative to each of the molar ratios of at least yttrium ion and aluminum ion in the mixed thin film fluid. When the pH of the thin film fluid after the mixing is made in the range of 7.5 to 9.0, the molar ratios of the constituent elements in the YAG precursor microparticle to be obtained and in the YAG microparticle can be made ±10% relative to each of the molar ratios of the ions of the elements to constitute the YAG precursor microparticle in the mixed thin film fluid.

In the present invention, the pH of the fluid which contains the ions of the elements to constitute the YAG precursor microparticle and/or of the basic fluid is not particularly restricted; however, the pH of the basic fluid is preferably 7 or higher, or more preferably 9 or higher. This pH can be changed arbitrarily in accordance with kind of the raw materials of the ions of the elements to constitute the YAG precursor microparticle, kind of the intended or targeted YAG precursor microparticle and YAG microparticle, molar ratios of the constituent elements thereof, particle diameters of the YAG precursor microparticle and the YAG microparticle, and the like.

Change of the Introduction Rates:

In the present invention, in order to control the pH of the thin film fluid after the mixing, the pH of the thin film fluid after the mixing may be controlled by changing the introduction rates of at least any one of the fluids to be processed that are introduced into between the processing surfaces 1 and 2, that is, at least any one of the fluid which contains the ions of the elements to constitute the YAG precursor microparticle and the basic fluid. By changing the introduction rates of at least any one of the fluids to be processed that are introduced into between the processing surfaces 1 and 2, that is, at least any one of the fluid which contains the ions of the elements to constitute the YAG precursor microparticle and the basic fluid, the pH of the thin film fluid after the mixing can be controlled readily and precisely; and thus, it has an advantage that the molar ratios of the constituent elements in the YAG precursor microparticle to be obtained and the YAG microparticle can be readily controlled. In this method, there is an advantage that the mixing ratio of the basic substance relative to the ions of the elements to constitute the YAG precursor microparticle in the thin film fluid can be readily controlled by mere changing of the introduction rates of at least any one of the fluid which contains the ions of the elements to constitute the YAG precursor microparticle and the basic fluid; and as a result, the molar ratios of the constituent elements in the YAG precursor microparticle and in the YAG microparticle can be readily controlled; and thus, the YAG precursor microparticle or the YAG microparticle can be produced in accordance with the purposes thereof without cumbersome examination of the recipe, an expensive equipment, or a high energy consumption, these having been required in conventional methods.

Method for Changing the Introduction Rates:

There is no particular restriction as to the method for changing at least any one of the introduction rates of the fluids to be introduced into between the processing surfaces 1 and 2, namely the fluid which contains the ions of the elements to constitute the YAG precursor microparticle and the basic fluid. At least any one of the introduction rates of the fluids to be introduced into between the processing surfaces 1 and 2, namely the fluid which contains the ions of the elements to constitute the YAG precursor microparticle and the basic fluid, may be changed by using the fluid pressure imparting mechanism p in the fluid processing apparatus; or at least any one of the introduction rates of the fluids to be introduced into between the processing surfaces 1 and 2, namely the fluid which contains the ions of the elements to constitute the YAG precursor microparticle and the basic fluid, may be changed by using a fluid supplying equipment such as a pump. Alternatively, at least any one of the introduction rates of the fluids to be introduced into between the processing surfaces 1 and 2, namely the fluid which contains the ions of the elements to constitute the YAG precursor microparticle and the basic fluid, may be changed by using a force feed system using a gas such as an air and a nitrogen gas. A combined method of the fluid pressure imparting mechanism p, the fluid supplying equipment such as a pump, and the force feed system using a gas, may also be used.

Microparticles:

In the present invention, because the YAG precursor microparticle is separated between the processing surfaces 1 and 2 which can approach to and separate from each other as shown above, the YAG precursor having the molar ratios of the constituent elements controlled precisely can be separated as microparticles. Particle diameter thereof can also be readily controlled by changing such conditions as rotation speeds of processing members 10 and 20 of the fluid processing apparatus, and introduction rates, temperatures, and recipes of the fluids to be processed that are introduced into the fluid processing apparatus; and thus, the particle diameter thereof can be readily controlled simultaneously with control of the molar ratios of the constituent elements of the YAG precursor microparticle. There is no particular restriction as to the particle diameters of the YAG precursor microparticle obtained by carrying out the present invention and of the YAG microparticle obtained after the heat-treatment. In the present invention, nanoparticles with the average particle diameter of 1 μm or less can be produced in both the YAG precursor microparticle and the YAG microparticle obtained after the heat-treatment mentioned later.

Dispersing Agent and so Forth:

In the present invention, various dispersing agents and surfactants may be used in accordance with the purpose and the necessity. Though not particularly restricted, various commercially available general surfactants and dispersing agents as well as a newly synthesized substance may be used. Illustrative example thereof includes an anionic surfactant, a cationic surfactant, a nonionic surfactant, as well as a dispersing agent such as various polymers. These may be used singly or as a combination of two or more of them.

The surfactants and dispersing agents may be contained in the fluid which contains the ions of the elements to constitute the YAG precursor microparticle, in the basic fluid, or in the both fluids. Alternatively, the surfactants and the dispersing agents may be contained in a third fluid that is different from the fluid which contains the ions of the elements to constitute the YAG precursor microparticle and the basic fluid.

Temperature:

In the present invention, the temperature at the time when the fluid which contains the ions of the elements to constitute the YAG precursor microparticle is mixed with the basic fluid is not particularly restricted. The temperature may be arbitrarily chosen in accordance with the kind of the raw material of the ions of the elements to constitute the YAG precursor microparticle, the kind of the basic substance, the kinds, the molar ratios, and the particle diameters of the intended or targeted YAG precursor microparticle and YAG microparticle, the pH of the thin film fluid after the mixing, and the like.

Heat Treatment:

By heat treatment of the YAG precursor microparticle produced by the present invention, the YAG microparticle can be obtained. There is no particular restriction as to the heat treatment, so that various dry and wet heat treatment methods may be used. One example thereof is the heat treatment by burning in a furnace, wherein the burning conditions such as temperature and time for this burning may be chosen arbitrarily. In the present invention, heat treatment even at relatively low burning temperature in the range of 950 to 1000° C. can convert the YAG precursor microparticle to the YAG microparticle.

Hereinafter, the present invention will be explained in more detail by Examples; but the present invention is not limited only to these Examples.

Production of the Cerium-Doped Yttrium Gadolinium Aluminum Garnet Microparticle:

In Examples 1 to 10, respective nitrate salt hydrates of yttrium, aluminum, gadolinium, and cerium as mentioned later were dissolved into pure water to obtain a raw material solution (fluid which contains the ions of the elements to constitute the YAG precursor microparticle), which was then mixed with an aqueous ammonia solution or an aqueous hydrazine monohydrate solution (basic fluid) in the thin film fluid formed between the processing surfaces 1 and 2 by using the fluid processing apparatus as shown in FIG. 1 based on the same principle as the apparatus described in Patent Document 4, whereby separating the YAG precursor microparticle comprised of the above-mentioned elements. In this occasion, at least any one of the introduction rates of the raw material solution and the basic fluid was changed, whereby the pH of the thin film fluid after the mixing was controlled so as to control the molar ratios of the constituent elements in the obtained YAG precursor microparticle.

It is to be noted here that the term "from the center" in the following Examples means "from the first introduction part d1" of the processing apparatus shown in FIG. 1; the first fluid means the first fluid to be processed that is introduced through the first introduction part d1 of the processing apparatus as described before; and the second fluid means the second fluid to be processed that is introduced through the second introduction part d2 of the processing apparatus shown in FIG. 1, as described before.

Measurement of pH:

Measurement of pH was made by using a pH meter (Type D-51, manufactured by Horiba Ltd.). Before introducing each of the fluids to be processed into the fluid processing apparatus, pH of each of the fluids to be processed was measured at room temperature.

Powder X-Ray Diffraction: XRD

The X-ray diffraction measurement was done by using the fully automated multi-purpose X-ray diffraction instrument X'Pert PRO MPD (manufactured by PANalytical B. V.). The diffraction strength was measured in the diffraction range of 10 to 100° as 2θ.

ICP Analysis:

Quantitative analyses of element contained in the YAG precursor microparticle by the inductively coupled plasma atomic emission spectrophotometry (ICP) were carried out by using ICPS-8100 (manufactured by Shimadzu Corp.).

TEM-EDS Analysis:

The quantitative analyses of element in the YAG precursor microparticles by TEM-EDS were carried out by the transmission electron microscope JEM-2100 (manufactured by JEOL Ltd.) equipped with the energy dispersive X-ray analyzer JED-2300 (manufactured by JEOL Ltd.). The analysis was done by using the beam diameter of 5 nm to calculate the molar ratio of element in the YAG precursor microparticles. Specifically, 10 analysis points were chosen in each of 10 of the obtained YAG microparticles; and molar ratios of each of elements at respective analysis points were calculated, from which values the average value was used.

Fluorescence Spectrum Analysis:

Fluorescence spectrum measurement of the obtained YAG microparticle by the fluorescence spectrophotometer was made with FP-6500 (manufactured by JASCO Corporation) with the excitation wavelength in the range of 300 to 450 nm.

While the 0.3% by weight of aqueous ammonia solution or the 2.5% by weight of aqueous hydrazine monohydrate solution was introduced as basic fluid of the first fluid from the center with the supply pressure of 0.30 MPaG, the rotation number of 1700 rpm, and the temperature of 25° C., the solution which was obtained by dissolving aluminum nitrate nonahydrate, cerium nitrate trihydrate, gadolinium nitrate trihydrate, and yttrium nitrate hexahydrate in pure water (aqueous solution comprising 7.6% by weight of aluminum nitrate nonahydrate, 0.024% by weight of cerium nitrate trihydrate, 1.4% by weight of gadolinium nitrate trihydrate, and 3.4% by weight of yttrium nitrate hexahydrate; molar ratio of Al:Y:Gd:Ce=62.50:27.35:9.96:0.19, according to the ICP analysis result of the raw material solution) was introduced as raw material solution of the second fluid at 25° C. into between the processing surfaces 1 and 2 to mix the first fluid and the second fluid in the thin film fluid. The respective supply temperatures of the first fluid and the second fluid were measured just before the first fluid and the second fluid each was introduced into the processing apparatus (in more detail, just before introduction into between the processing surfaces 1 and 2). The dispersion solution containing the YAG precursor microparticles was discharged from between the processing surfaces 1 and 2. The dispersion solution containing the YAG precursor microparticles discharged therefrom was subjected to centrifugal separation whereby removing the supernatant solution thereof. After the washing operation by pure water was repeated for three times, the remained solid was dried at 100° C. under an atmospheric pressure to obtain dried powders of the YAG precursor microparticles. The dried powders of the YAG precursor microparticles were preliminarily burnt at 800° C. for 3 hours, and then burnt further at 1100° C. for 2 hours to obtain the YAG microparticles. The ICP analysis was done as to the dried powders of the YAG precursor microparticles. The diameter of the primary particle of the dried powders of the YAG precursor microparticle was confirmed with the TEM observation. The TEM observation was done with the magnification of 50,000 or more as the observation condition; and the average value of the 3 points was used. In Table 1, the processing conditions including pH of each of the fluids are shown. In Table 2, shown are the pH of the fluid discharged from between the processing surfaces, the ICP analysis results of the dried powders of the YAG precursor microparticles (in the Table, shown as "ICP result (mol %)"), the ratio relative to the ICP analysis result of the raw material solution (in the Table, shown as "ICP result/amount in thin film fluid (%)"), and the diameter of the primary particle of the YAG precursor microparticles. In Table 3, shown are the TEM-EDS analysis result of the YAG microparticles obtained by preliminary burning of the aforementioned dried powders at 800° C. for 3 hours followed by burning them at 1100° C. for 2 hours (in the Table, shown as "EDS result (mol %)"), the ratio relative to the ICP analysis result of the raw material solution (in the Table, shown as "EDS result/amount in thin film fluid (%)"), and the diameter of the primary particle of the YAG microparticles. Meanwhile, "amount in thin film fluid" in Table 2 and Table 3 means the molar ratio calculated from each element amount to constitute the YAG precursor microparticle in the raw material solution that was introduced into the thin film fluid (above-mentioned ICP analysis result of the raw material solution). "ICP result/amount in thin film fluid (%)" in Table 2 was calculated from "ICP result/amount in thin film fluid (%)=(ICP analysis result of dried powder of YAG precursor microparticle–amount in thin film fluid)/(amount in thin film fluid)×100"; and "EDS result/amount in thin film fluid (%)" in Table 3 was calculated from "EDS result/amount in thin film fluid (%)=(TEM-EDS analysis result of YAG microparticle–amount in thin film fluid)/(amount in thin film fluid)×100". Mixing of the first fluid and the second fluid is executed in the fluid processing apparatus as mentioned above, wherein in the present Examples, the pH of the thin film fluid after the mixing was taken from the measured pH of the dispersion solution containing the YAG precursor microparticle, the solution discharged from between the processing surfaces 1 and 2.

Comparative Example:

Comparative Example was carried out by using the processing conditions of Example 6. The recipes of the first fluid and the second fluids were the same as those of Example 6, while a 100 mL of the first fluid in a beaker was stirring at 25° C., a 10 mL of the second fluid (25° C.) was charged into the beaker over 1 minute. Together with the examples, the results are shown in Table 2 and Table 3.

TABLE 1

| | | | First fluid | | | Second fluid | | | |
|---|---|---|---|---|---|---|---|---|---|
| Example | Rotation number (rpm) | Recipe | Supply rate (mL/minute) | Supply temperature (° C.) | pH | Supply rate (mL/minute) | Supply temperature (° C.) | pH | Discharged solution pH |
| 1 | 1700 | 0.3 wt % aqueous ammonia | 120 | 25 | 11.4 | 10 | 25 | 3.37 | 6.77 |
| 2 | 1700 | 0.3 wt % aqueous ammonia | 130 | 25 | 11.4 | 10 | 25 | 3.37 | 7.01 |
| 3 | 1700 | 2.5 wt % aqueous | 50 | 25 | 10.63 | 10 | 25 | 3.37 | 7.32 |

TABLE 1-continued

| | | | First fluid | | | Second fluid | | | |
|---|---|---|---|---|---|---|---|---|---|
| Example | Rotation number (rpm) | Recipe | Supply rate (mL/minute) | Supply temperature (° C.) | pH | Supply rate (mL/minute) | Supply temperature (° C.) | pH | Discharged solution pH |
| 4 | 1700 | hydrazine monohydrate 0.3 wt % aqueous ammonia | 150 | 25 | 11.4 | 10 | 25 | 3.37 | 7.9 |
| 5 | 1700 | 0.3 wt % aqueous ammonia | 160 | 25 | 11.4 | 10 | 25 | 3.37 | 8.17 |
| 6 | 1700 | 2.5 wt % aqueous hydrazine monohydrate | 100 | 25 | 10.63 | 10 | 25 | 3.37 | 8.3 |
| 7 | 1700 | 0.3 wt % aqueous ammonia | 170 | 25 | 11.4 | 10 | 25 | 3.37 | 8.71 |
| 8 | 1700 | 2.5 wt % aqueous hydrazine monohydrate | 300 | 25 | 10.63 | 10 | 25 | 3.37 | 8.97 |
| 9 | 1700 | 2.5 wt % aqueous hydrazine monohydrate | 500 | 25 | 10.63 | 10 | 25 | 3.37 | 9.17 |
| 10 | 1700 | 0.3 wt % aqueous ammonia | 800 | 25 | 11.4 | 10 | 25 | 3.37 | 10.09 |
| 11 | 1700 | 0.3 wt % aqueous ammonia | 1000 | 25 | 11.4 | 10 | 25 | 3.37 | 10.22 |

TABLE 2

| | | YAG precursor microparticle; ICP analysis result | | | | | | | | |
|---|---|---|---|---|---|---|---|---|---|---|
| | | Al | | Y | | Gd | | Ce | | |
| Example | Discharged solution pH | ICP result (mol %) | ICP result/amount in thin film fluid (%) | ICP result (mol %) | ICP result/amount in thin film fluid (%) | ICP result (mol %) | ICP result/amount in thin film fluid (%) | ICP result (mol %) | ICP result/amount in thin film fluid (%) | Primary particle diameter (nm) |
| 1 | 6.77 | 73.82 | 18.11 | 20.54 | −24.90 | 5.64 | −43.37 | 0.00 | −100.0 | 20 |
| 2 | 7.01 | 67.02 | 7.23 | 25.07 | −8.34 | 7.86 | −21.08 | 0.05 | −73.68 | 10 to 20 |
| 3 | 7.32 | 65.48 | 4.77 | 25.32 | −7.42 | 9.14 | −8.23 | 0.06 | −68.42 | 5 |
| 4 | 7.90 | 63.33 | 1.33 | 27.69 | 1.24 | 8.87 | −10.94 | 0.11 | −42.11 | 100 to 300 |
| 5 | 8.17 | 62.76 | 0.42 | 27.97 | 2.27 | 9.13 | −8.33 | 0.14 | −26.32 | 30 to 70 |
| 6 | 8.30 | 61.85 | −1.04 | 28.45 | 4.02 | 9.52 | −4.42 | 0.18 | −5.26 | 5 to 10 |
| 7 | 8.71 | 60.35 | −3.44 | 29.81 | 8.99 | 9.72 | −2.41 | 0.12 | −36.84 | 200 to 600 |
| 8 | 8.97 | 62.18 | −0.51 | 28.12 | 2.82 | 9.52 | −4.42 | 0.18 | −5.26 | 50 to 80 |
| 9 | 9.17 | 64.53 | 3.25 | 25.45 | −6.95 | 9.90 | −0.60 | 0.12 | −36.84 | 50 to 100 |
| 10 | 10.09 | 56.61 | −9.42 | 32.38 | 18.39 | 10.85 | 8.94 | 0.16 | −15.79 | 10 to 20 |
| 11 | 10.22 | 54.54 | −12.74 | 33.86 | 23.80 | 11.42 | 14.66 | 0.18 | −5.26 | 300 |
| Comparative Example | 8.30 | 81.52 | 30.43 | 16.42 | −39.96 | 2.05 | −79.42 | 0.01 | −94.74 | 200 to 2500 |

TABLE 3

| | | YAG microparticle; TEM-EDS analysis result | | | | | | | | |
|---|---|---|---|---|---|---|---|---|---|---|
| | | Al | | Y | | Gd | | Ce | | |
| Example | Discharged solution pH | EDS result (mol %) | EDS result/amount in thin film fluid (%) | EDS result (mol %) | EDS result/amount in thin film fluid (%) | EDS result (mol %) | EDS result/amount in thin film fluid (%) | EDS result (mol %) | EDS result/amount in thin film fluid (%) | Primary particle diameter (nm) |
| 1 | 6.77 | 75.36 | 20.58 | 19.00 | −30.53 | 5.64 | −43.37 | 0.00 | −100.00 | 20 |
| 2 | 7.01 | 68.45 | 9.52 | 23.65 | −13.53 | 7.84 | −21.29 | 0.06 | −68.42 | 10 to 20 |
| 3 | 7.32 | 65.52 | 4.83 | 25.28 | −7.57 | 9.10 | −8.63 | 0.10 | −47.37 | 5 |

TABLE 3-continued

| | | YAG microparticle; TEM-EDS analysis result | | | | | | | | |
|---|---|---|---|---|---|---|---|---|---|---|
| | | Al | | Y | | Gd | | Ce | | |
| Example | Discharged solution pH | EDS result (mol %) | EDS result/amount in thin film fluid (%) | EDS result (mol %) | EDS result/amount in thin film fluid (%) | EDS result (mol %) | EDS result/amount in thin film fluid (%) | EDS result (mol %) | EDS result/amount in thin film fluid (%) | Primary particle diameter (nm) |
| 4 | 7.90 | 62.89 | 0.62 | 28.13 | 2.85 | 8.85 | −11.14 | 0.13 | −31.58 | 100 to 300 |
| 5 | 8.17 | 63.45 | 1.52 | 27.28 | −0.26 | 9.11 | −8.53 | 0.16 | −15.79 | 30 to 70 |
| 6 | 8.30 | 61.85 | −1.04 | 28.45 | 4.02 | 9.52 | −4.42 | 0.18 | −5.26 | 5 to 10 |
| 7 | 8.71 | 60.11 | −3.82 | 30.05 | 9.87 | 9.67 | −2.91 | 0.17 | −10.53 | 200 to 600 |
| 8 | 8.97 | 64.59 | 3.34 | 25.75 | −5.85 | 9.50 | −4.62 | 0.16 | −15.79 | 50 to 80 |
| 9 | 9.17 | 65.12 | 4.19 | 24.86 | −9.10 | 9.89 | −0.70 | 0.13 | −31.58 | 50 to 100 |
| 10 | 10.09 | 57.12 | −8.61 | 31.87 | 16.53 | 10.90 | 9.44 | 0.11 | −42.11 | 10 to 20 |
| 11 | 10.22 | 56.32 | −9.89 | 32.08 | 17.29 | 11.42 | 14.66 | 0.18 | −5.26 | 300 |
| Comparative Example | 8.30 | 85.46 | 36.74 | 11.23 | −58.94 | 3.30 | −66.87 | 0.01 | −94.74 | 1100 to 3000 |

From Table 1 to Table 3, it was confirmed that by mixing the raw material solution (fluid which contains the ions of the elements to constitute the YAG precursor microparticle) with the basic fluid in the thin film fluid whereby controlling the pH of the thin film fluid after the mixing, the molar ratios of the constituent elements in the obtained YAG precursor microparticle and in the YAG microparticle could be controlled. It was found that especially when the pH of the thin film fluid after the mixing was controlled in the range of 7.0 to 10.0, each of the molar ratios of at least yttrium and aluminum in the obtained YAG precursor microparticle and in the YAG microparticle could be made within ±20% relative to the respective molar ratios of at least yttrium ion and aluminum ion contained in the raw material solution (fluid which contains the ions of the elements to constitute the YAG precursor microparticle) in the mixed thin film fluid, and further that when the pH of the thin film fluid after the mixing was controlled in the range of 7.5 to 9.0, each of the molar ratios of at least yttrium and aluminum in the obtained YAG precursor microparticle and in the YAG microparticle could be made within ±10% relative to the respective molar ratios of at least yttrium ion and aluminum ion contained in the raw material solution in the mixed thin film fluid.

Figure 5:
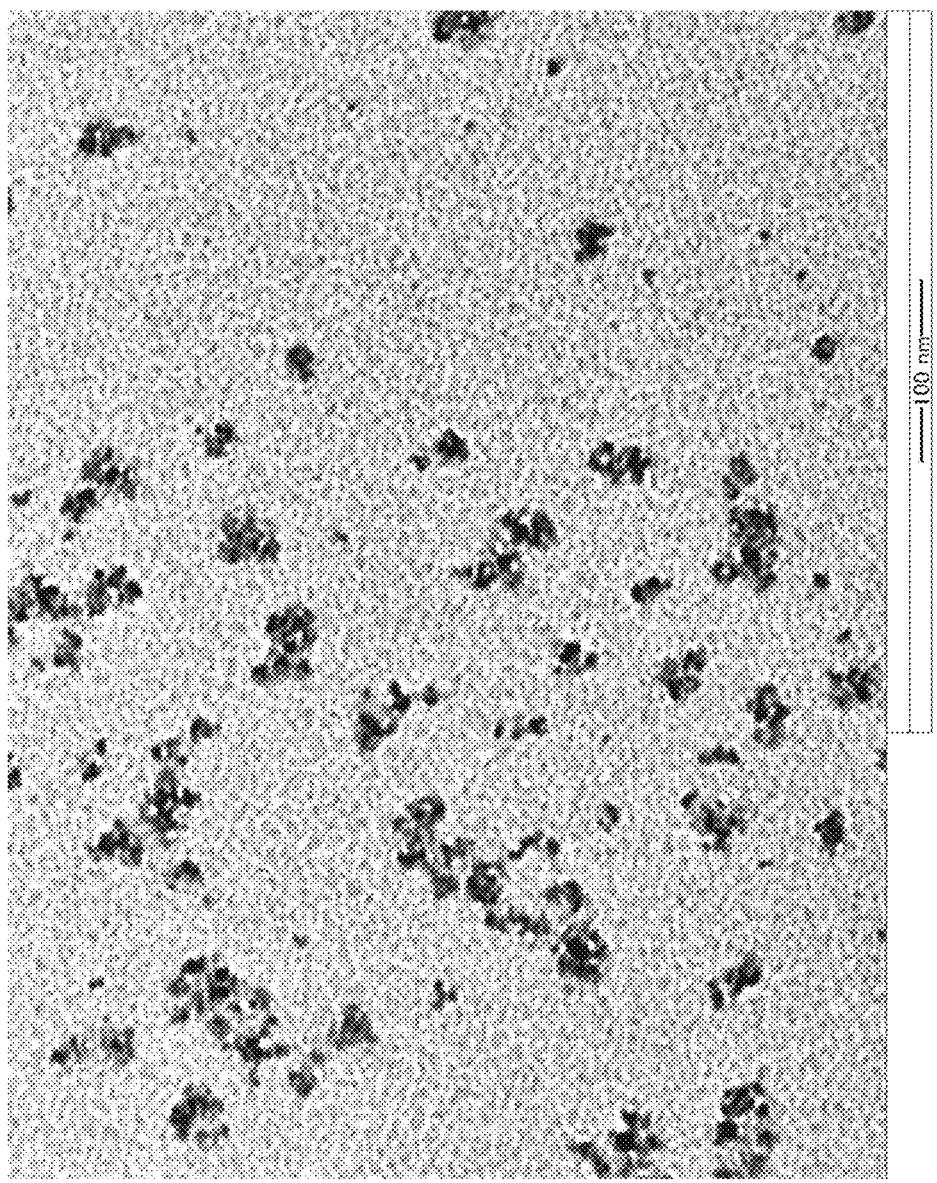
FIG. 5 is the TEM picture of the cerium-doped yttrium gadolinium aluminum garnet precursor microparticles that were produced in Example 6.
Figure 6:
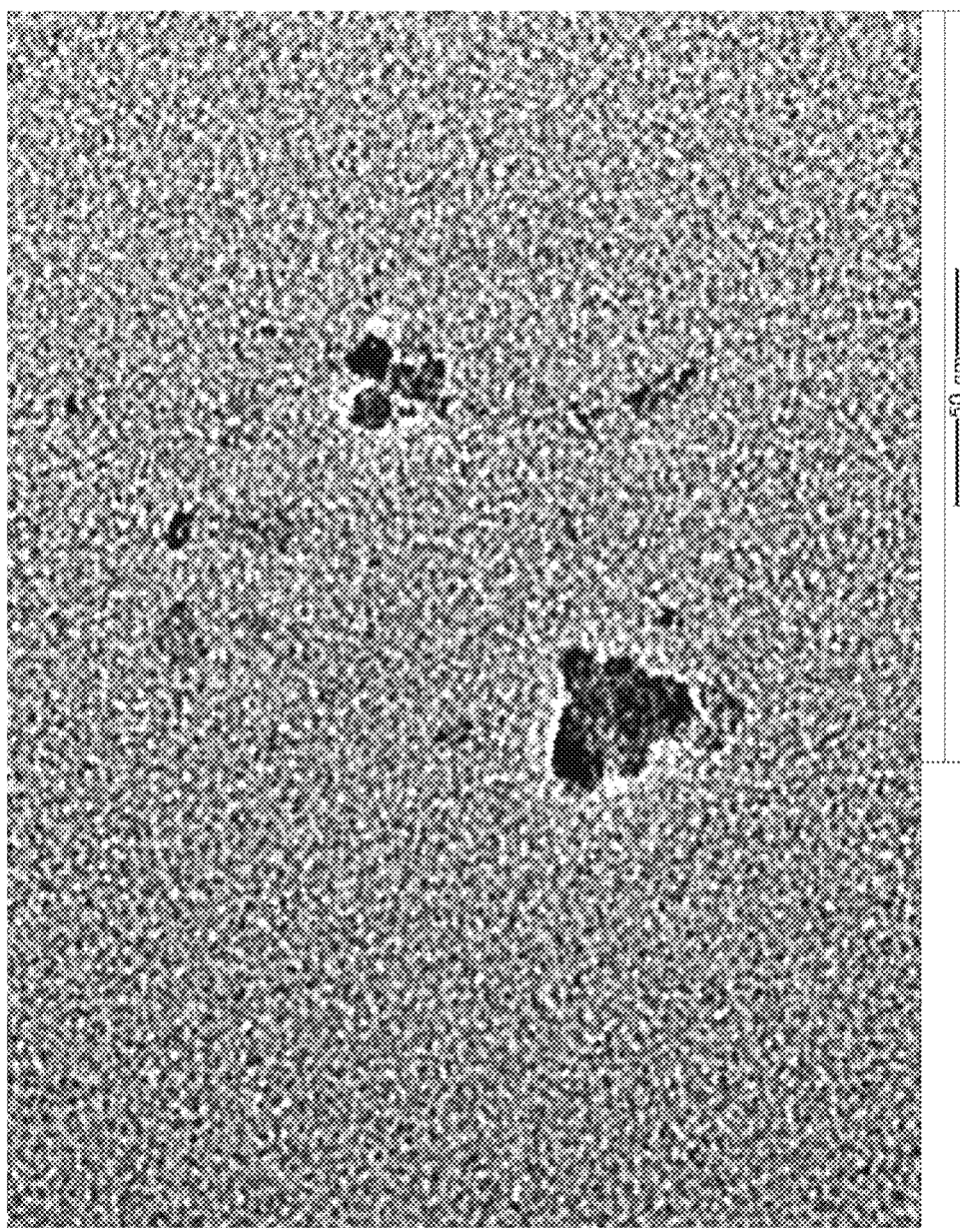
FIG. 6 is the TEM picture of the cerium-doped yttrium gadolinium aluminum garnet microparticles that were obtained by subjecting to heat treatment the cerium-doped yttrium gadolinium aluminum garnet precursor microparticles that were produced in Example 6.

The TEM picture of the YAG precursor microparticles obtained in Example 6 is shown in FIG. 5, and the TEM picture of the YAG microparticles obtained by subjecting to heat treatment the YAG precursor microparticles obtained in Example 6 is shown in FIG. 6. It can be seen that the particle diameter of the primary particle in the both pictures are roughly in the range of 5 to 10 nm.

Figure 7:
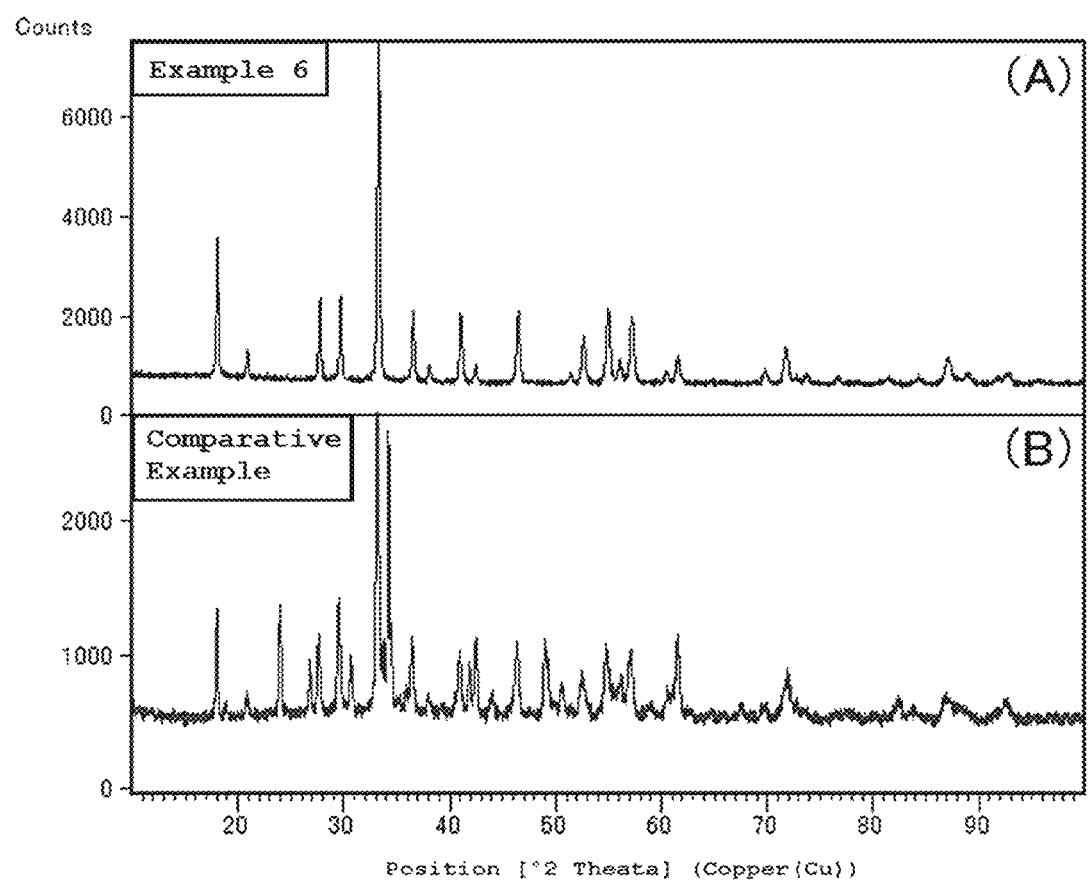
FIG. 7 shows (A) the XRD measurement result of the cerium-doped yttrium gadolinium aluminum garnet microparticles that were obtained by subjecting to heat treatment the cerium-doped yttrium gadolinium aluminum garnet precursor microparticles that were produced in Example 6, and (B) the XRD measurement result of the particles containing the cerium-doped yttrium gadolinium aluminum garnet microparticles that were obtained by subjecting to heat treatment the particles that were produced in Comparative Example.
Figure 8:
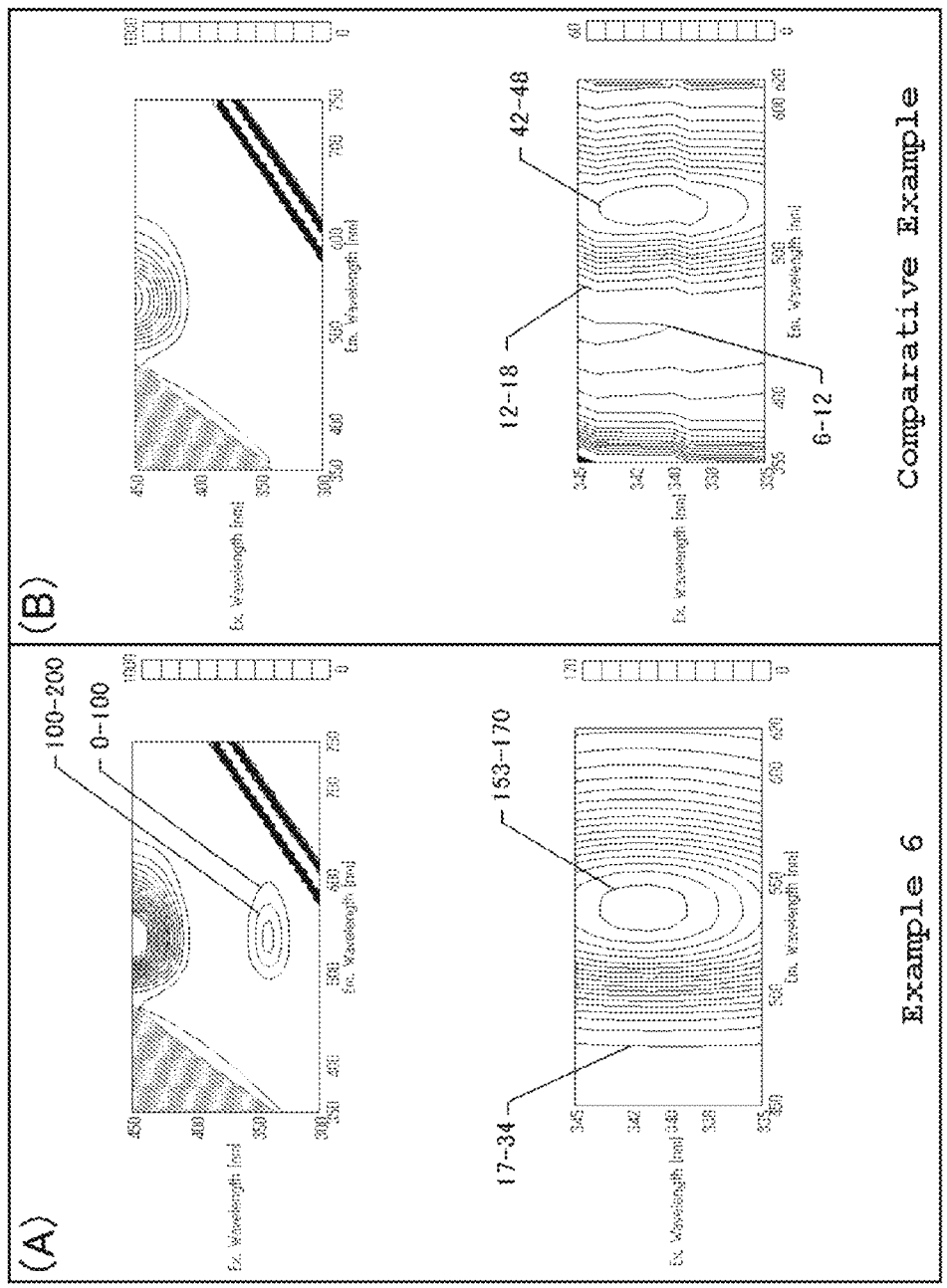
FIG. 8 shows (A) the three-dimensional fluorescence spectrum measurement result of the cerium-doped yttrium gadolinium aluminum garnet microparticles that were obtained by subjecting to heat treatment the cerium-doped yttrium gadolinium aluminum garnet precursor microparticles that were produced in Example 6, and (B) the three-dimensional fluorescence spectrum measurement result of the particles containing the cerium-doped yttrium gadolinium aluminum garnet microparticles that were obtained by subjecting to heat treatment the particles that were produced in Comparative Example.

The XRD measurement result of the YAG microparticle obtained by subjecting to heat treatment the YAG precursor microparticle that was obtained in Example 6 is shown in FIG. 7(A); the three-dimensional fluorescence spectrum measurement result of the same is shown in FIG. 8(A); the XRD measurement result of the particle obtained by subjecting to heat treatment (the conditions thereof are the same as those of Examples) the particle that was obtained in Comparative Example is shown in FIG. 7(B); and the three-dimensional fluorescence spectrum measurement result of the same is shown in FIG. 8(B). Meanwhile, in FIGS. 8(A) and 8(B), respective measurement results of the three-dimensional fluorescence spectra are shown in the upper stage and the lower stage, wherein the picture in the lower stage shows the enlarged picture of the upper stage. The values shown in the contour lines in FIGS. 8(A) and 8(B) show the fluorescence intensities.

It was found from Example 6 and Comparative Example that by mixing the fluid which contained the ions of the elements to constitute the YAG precursor microparticle with the basic fluid in the thin film fluid formed between the processing surfaces 1 and 2 that can approach to and separate from each other, the YAG precursor microparticle and the YAG microparticle, the both being uniform, could be produced. Specifically, as a result of search matching of FIGS. 7(A) and 7(B), only the diffraction peaks of the garnet structure could be confirmed in Example 6, while the diffraction peaks of both the garnet structure and of the structures other than the garnet structure could be confirmed in Comparative Example, suggesting that a plurality of structures including the YAG microparticle were formed in Comparative Example.

From the results of the three-dimensional fluorescence spectra measurement shown in FIGS. 8(A) and 8(B), in Example 6, it can be seen the florescence in the range of about 480 to 620 nm in the exciting wavelength region of about 325 to 360 nm and the maximum fluorescence peak at near 540 nm by the excitation wavelength of near 340 nm, while there are no clear fluorescence in this wavelength region in Comparative Example. From these results, it could be confirmed that the YAG florescent microparticle was produced in Example 6. In other Examples, similar results to those of Example 6 were obtained. From these results, it was found that the uniform YAG fluorescent microparticle could be produced in Examples of the present invention.

In Examples 4 to 8 in which the pH of the thin film fluid after the mixing was controlled in the range of 7.5 to 9.0, it was confirmed that the YAG microparticle obtained by preliminary burning of the dried powder of the obtained YAG precursor microparticle at 800° C. for 3 hours followed by burning it at 950 to 1000° C. for 2 hours was also the fluorescent body.

1 first processing surface

2 second processing surface

10 first processing member

11 first holder

20 second processing member

21 second holder d1 first introduction part d2 second introduction part d20 opening

The invention claimed is:

1. A method for producing a garnet precursor microparticle, the method comprising the steps of:
   providing at least two element ions;
   providing at least two processing surfaces arranged facing with each other, the at least two processing surfaces being operable to approach to and separate from each other, at least one of the at least two processing surfaces rotating relative to the other;
   mixing the at least two element ions with a basic substance between the at least two processing surfaces to form a thin film fluid;
   producing and separating a microparticle in the thin film fluid, the separated microparticle being a garnet precursor microparticle, and containing the at least two elements,
   wherein each molar ratio of the at least two elements in the garnet precursor microparticle is controlled by controlling pH of the thin film fluid after the step of mixing.

2. The method for producing a garnet precursor microparticle according to claim 1, wherein
   the at least two element ions contain at least yttrium ion and aluminum ion,
   the garnet precursor microparticle is an yttrium aluminum garnet precursor microparticle, and
   the molar ratios of at least yttrium and aluminum in the yttrium aluminum garnet precursor microparticle are controlled by controlling pH of the thin film fluid after the step of mixing.

3. The method for producing a garnet precursor microparticle according to claim 1, further comprising:
   providing at least two fluids to be processed, including a first fluid and a second fluid, the first fluid containing at least yttrium ion and aluminum ion as the at least two element ions, the second fluid being a basic fluid which contains said basic substance;
   mixing the at least two fluids to form said thin film fluid between the at least two processing surfaces;
   producing and separating an yttrium aluminum garnet precursor microparticle in the thin film fluid; and
   controlling an introduction rate of at least one fluid to be processed that is introduced into between the processing surfaces to adjust the molar ratios of at least yttrium and aluminum in the yttrium aluminum garnet precursor microparticle.

4. The method for producing a garnet precursor microparticle according to claim 2, wherein the molar ratios of at least yttrium and aluminum in the yttrium aluminum garnet precursor microparticle are made within ±20% relative to the molar ratios of the yttrium ion and the aluminum ion mixed in the thin film fluid by controlling pH of the thin film fluid after the step of mixing in the range of 7.0 to 10.0.

5. The method for producing a garnet precursor microparticle according to claim 2, wherein the molar ratios of yttrium and aluminum in the yttrium aluminum garnet precursor microparticle are obtained by an ICP analysis.

6. The method for producing a garnet precursor microparticle according to claim 2, wherein at least one element ion other than the yttrium ion, the aluminum ion, and the basic substance is mixed in the thin film fluid.

7. A method for producing a microparticle having a garnet structure, wherein the garnet structure is made by subjecting to heat treatment the garnet precursor microparticle that is produced by the method according to claim 1.

8. The method for producing a microparticle having a garnet structure according to claim 7, wherein the heat-treatment is done by burning, and a burning temperature is chosen in the range of 950 to 1000° C.

9. The method for producing a garnet precursor microparticle according to claim 2, wherein a particle diameter of the yttrium aluminum garnet precursor microparticle is 1 μm or less.

10. The method for producing a microparticle having a garnet structure according to claim 7, wherein
    the microparticle having a garnet structure is an yttrium aluminum garnet microparticle, and
    molar ratios of at least yttrium and aluminum in the yttrium aluminum garnet microparticle are made within ±20% relative to molar ratios of the yttrium ion and the aluminum ion mixed in the thin film fluid.

11. The method for producing a microparticle having a garnet structure according to claim 10, wherein the molar ratios of yttrium and aluminum in the yttrium aluminum garnet microparticle are obtained by a TEM-EDS analysis.

12. The method for producing a microparticle having a garnet structure according to claim 7, wherein a particle diameter of the microparticle having a garnet structure is 1 μm or less.

13. The method for producing a garnet precursor microparticle according to claim 3, wherein the molar ratios of at least yttrium and aluminum in the yttrium aluminum garnet precursor microparticle are made within ±20% relative to the molar ratios of the yttrium ion and the aluminum ion mixed in the thin film fluid by controlling pH of the thin film fluid after the step of mixing in the range of 7.0 to 10.0.

14. The method for producing a garnet precursor microparticle according to claim 3, wherein the molar ratios of yttrium and aluminum in the yttrium aluminum garnet precursor microparticle are obtained by an ICP analysis.

15. The method for producing a garnet precursor microparticle according to claim 4, wherein the molar ratios of yttrium and aluminum in the yttrium aluminum garnet precursor microparticle are obtained by an ICP analysis.

16. The method for producing a garnet precursor microparticle according to claim 3, wherein at least one element ion other than the yttrium ion, the aluminum ion, and the basic substance is mixed in the thin film fluid.

17. The method for producing a garnet precursor microparticle according to claim 4, wherein at least one element ion other than the yttrium ion, the aluminum ion, and the basic substance is mixed in the thin film fluid.

18. The method for producing a garnet precursor microparticle according to claim 5, wherein at least one element ion other than the yttrium ion, the aluminum ion, and the basic substance is mixed in the thin film fluid.

19. A method for producing a microparticle having a garnet structure, wherein the garnet structure is made by subjecting to heat treatment the garnet precursor microparticle that is produced by the method according to claim 2.

20. A method for producing a microparticle having a garnet structure, wherein the garnet structure is made by subjecting to heat treatment the garnet precursor microparticle that is produced by the method according to claim 3.

* * * * *

UNITED STATES PATENT AND TRADEMARK OFFICE
CERTIFICATE OF CORRECTION

| | |
|---|---|
| PATENT NO. | : 9,260,315 B2 |
| APPLICATION NO. | : 14/374502 |
| DATED | : February 16, 2016 |
| INVENTOR(S) | : Jun Kuraki et al. |

It is certified that error appears in the above-identified patent and that said Letters Patent is hereby corrected as shown below:

ON THE TITLE PAGE:

At item (71) - Applicant, change "M. TECHNIQUE CO., LTD., Izuma-shi, Osaka (JP)" to --M. TECHNIQUE CO., LTD., Izumi-shi, Osaka (JP)--.

Signed and Sealed this
Fourteenth Day of June, 2016

Michelle K. Lee
*Director of the United States Patent and Trademark Office*